US009124937B2

(12) United States Patent (10) Patent No.: US 9,124,937 B2
Stern (45) Date of Patent: Sep. 1, 2015

(54) MULTI-OPTION SOURCING OF CONTENT AND INTERACTIVE TELEVISION

(71) Applicant: Peter Stern, Riverside, CT (US)

(72) Inventor: Peter Stern, Riverside, CT (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/832,667

(22) Filed: Mar. 15, 2013

(65) Prior Publication Data

US 2014/0282734 A1    Sep. 18, 2014

(51) Int. Cl.
*G06F 3/00* (2006.01)
*G06F 13/00* (2006.01)
*H04N 5/445* (2011.01)
*H04N 7/173* (2011.01)
*H04N 21/478* (2011.01)
*H04N 21/472* (2011.01)
*H04N 21/482* (2011.01)

(52) U.S. Cl.
CPC ........... *H04N 21/478* (2013.01); *H04N 21/472* (2013.01); *H04N 21/482* (2013.01)

(58) Field of Classification Search
CPC . H04N 21/478; H04N 21/235; H04N 21/435; H04N 21/4312; H04N 21/47211; H04N 21/8126; H04N 5/44543; H04N 21/4316; H04N 21/458; H04N 21/4622; H04N 21/4821; H04N 21/482; H04N 21/4722; H04N 21/4782

USPC ............... 725/40, 43–44, 51, 59, 61
See application file for complete search history.

(56) References Cited

U.S. PATENT DOCUMENTS

| | | | |
|---|---|---|---|
| 2005/0028195 A1* | 2/2005 | Feinleib et al. | 725/32 |
| 2008/0127264 A1* | 5/2008 | Klosterman et al. | 725/42 |
| 2008/0263599 A1* | 10/2008 | Knudson et al. | 725/50 |
| 2009/0055868 A1* | 2/2009 | Wehmeyer et al. | 725/40 |
| 2009/0178079 A1* | 7/2009 | Derrenberger et al. | 725/42 |
| 2010/0115559 A1* | 5/2010 | Ellis | 725/53 |

* cited by examiner

*Primary Examiner* — Benjamin R Bruckart
*Assistant Examiner* — Jen-Shi Huang
(74) *Attorney, Agent, or Firm* — Chapin IP Law, LLC

(57) ABSTRACT

A content manager receives a request to display a content guide of available content. In response to receiving the request, the content manager initiates display of the content guide on a display screen. In the displayed content guide, the content manager initiates display of multiple selectable content viewing options. A first selectable channel viewing option of the multiple content viewing options can be configured to correspond to a television channel from which to view content originating from a content sponsor. A second channel viewing option of the multiple content viewing options can be configured to correspond to an auxiliary channel with respect to the television channel from which to access available over-the-top content associated with the content originating from the content sponsor. Accordingly, a user can be easily notified of the availability of content on a television channel and over-the-top content associated with the television channel.

36 Claims, 16 Drawing Sheets

MAP
465

| VIEWED CHANNEL | NETWORK ADDRESS | SERVER RESOURCE |
|---|---|---|
| ... | ... | ... |
| 555 | N/A | N/A |
| 556 | CNN.COM (NETWORK ADD. #1) | 110-2 |
| 557 | ESPN.COM (NETWORK ADD. #2) | 110-3 |
| 558 | N/A | N/A |
| ... | ... | ... |

FIG. 5

| CHANNEL | 7:00 PM | 8:00 PM | 9:00 PM | 10:00 PM |
|---|---|---|---|---|
| ... | ... | ... | ... | ... |
| 555 CBS | DRAMA SHOW | COMEDY | | |
| 556 CNN | NEWS | LIVE INTERVIEW WITH TED TURNER | NEWS | |
| 556 WEB CNN | | | INTERACTIVE TV | |
| ... | ... | ... | ... | ... |
| 567 FOX | GERALDO SHOW LIVE | AMERICAN IDOL | | |
| 567 WEB FOX | INTERACTIVE TV | | INTERACTIVE TV | |
| 568 DISNEY | MOVIE | CARTOON | | |
| ... | ... | ... | ... | ... |

FIG. 8

CONTENT GUIDE 250-2

MULTI-OPTION SOURCING OF CONTENT AND INTERACTIVE TELEVISION

BACKGROUND

In accordance with conventional television technology, cable network subscribers can tune to any of multiple broadcast and/or video on demand channels to select from multiple different television programs available on a shared communication link. For example, via input to a conventional set-top box, any of one or more subscribers can select and tune to the CNN™ (Cable News Network™) channel to view a news program; the one or more subscribers can select and tune to the ESPN™ (Entertainment and Sports Programming Network) channel to view sports events; and so on. Thus, via selection of a respective television channel, a subscriber is able to select and playback many different types of scheduled or video on demand type of content.

In certain instances, a content sponsor assigned to a respective cable network channel may wish to make additional content available to a subscriber. The content may be interactive or custom in nature and/or may not lend itself to be transmitted in a standard broadcast in a video on demand or scheduled time slot. For example, in addition to making content available on a standard television channel, the content sponsor such as CNN™ may establish one or more different websites from which additional content (e.g., statistics, stock reports, business information, etc.) is available for viewing in an interactive manner by a subscriber.

In most situations, a user plays back broadcasted or video on demand content from a content sponsor on a display screen such as a television set (e.g., a large screen television). To view custom web content available from a respective content provider, the user typically must log on to a device other than the television set such as a respective computer, open a browser on the computer, and input the appropriate network address to the browser to retrieve the additional content. In this manner, via a computer device located at a disparate location with respect to the user's television, a subscriber can retrieve so-called over-the-top content to view additional content available from, for example, a CNN™ website.

Conventional technology includes so-called widgets (i.e., applications) that enable display of retrieved content on a display screen. For example, a subscriber can initiate execution of a weather widget via a respective set-top box. The weather widget retrieves information such as current weather conditions. The subscriber can activate a widget by viewing a listing of available widgets and then selecting a particular widget amongst the list for execution. When executed, the widget enables a respective subscriber to retrieve data such as display information and initiate display of the display information on a display screen.

BRIEF DESCRIPTION OF EMBODIMENTS

Conventional techniques of accessing content from different sources suffer from deficiencies. For example, it is often inconvenient for a user watching a television program on a respective television screen to switch over to use of a home computer in another room to view further information about the television program or selected channel from a corresponding content sponsor.

Embodiments herein are useful over conventional techniques. For example, embodiments herein enable a user such as a cable network subscriber to more easily retrieve and playback supplemental content associated with a content sponsor, television program, television channel, etc. In certain instances, embodiments herein enable a user to have a more interactive experience with respect to viewing content available from multiple sources.

More specifically, one embodiment herein includes receiving a request to display a content guide of available content. In response to receiving the request, a processing resource initiates display of the content guide on a display screen. In the displayed content guide, the processing resource initiates display of multiple selectable content viewing options. In one embodiment, a first selectable channel viewing option of the multiple content viewing options corresponds to a television channel from which to view content originating from a content sponsor. A second channel viewing option of the multiple content viewing options corresponds to an auxiliary channel (with respect to the television channel) providing the subscriber to access available over-the-top content or other supplemental content associated with the content available on the television channel originating from the content sponsor. Accordingly, via display of a content guide displaying a novel channel lineup, a viewer can be easily notified of the availability of original content and corresponding related content available from different sources (e.g., a television channel and an auxiliary channel supporting retrieval of over-the-top content).

By further way of a non-limiting example, the channel lineup (i.e., channels of available content to a subscriber) can include a first content viewing option specifying a standard television from which to view scheduled or video on demand television programs. The second content viewing option (potentially displayed adjacent to the first content viewing option) in the channel lineup enables a respective subscriber to retrieve supplemental content such as over-the-top content associated with the television program and/or television channel. Via selection of the different content viewing options on a display screen, a viewer is able to more easily select retrieval of main content and supplemental content from multiple different sources.

Further embodiments herein can include receiving a command to view supplemental content associated with a television program while the television program is currently rendered on a display screen. In one non-limiting example embodiment, subsequent to and in response to receiving the command, a processing resource maps an identity of the television program to a corresponding network address from which the supplemental content such as web content associated with the television program is retrievable. The processing resource retrieves the supplemental content from a server resource as specified by the corresponding network address and initiates display of the supplemental content on the display screen. Accordingly, a user can initially select and view content in a scheduled time of a television channel. The user can view additional content (e.g., custom or generic over-the-top content) associated with the selected television program via input of an appropriate display command.

Note that display of related content is not limited to content associated with a respective television program. For example, embodiments herein can further include rendering content received over a cable network channel on a display screen. The cable network channel can be assigned to distribute content originating from a particular content sponsor assigned to the cable network channel. As an example, a business entity such as CNN™ may provide the content to be broadcasted on a corresponding assigned cable network channel.

Assume in one example embodiment that a user currently viewing content on the CNN™ cable network channel initiates a request to view web content associated with the CNN™ cable network channel. In one embodiment, in response to receiving the request to access supplemental content associated with the cable network channel: a respective processing resource receiving the request maps an identity of the cable network channel currently displayed on the display screen to a network address of a server resource from which the supplemental content associated with the selected cable network channel is retrievable. The processing resource retrieves the supplemental content from the server resource as specified by the network address and initiates display of the supplemental content (such as web content) on the display screen. Accordingly, embodiments herein enable a user to easily initiate display of supplemental over-the-top content associated with a currently viewed television channel.

These and more detailed embodiments are discussed below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, one or more memory chips, etc., or other non-transitory media such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by at least one processor of a respective computer device, cause the processor or multiple processors of the system to: receive a request to display a content guide of available content; in response to receiving the request, initiate display of the content guide on a display screen; and in the displayed content guide, initiating display of multiple selectable content viewing options, a first selectable channel viewing option corresponding to a television channel from which to view content originating from (i.e., provided by) a content sponsor, a second channel viewing option corresponding to an auxiliary channel with respect to the television channel from which to access available over-the-top content associated with the content originating from the content sponsor.

Another embodiment as discussed herein includes a computer readable storage medium and/or system having instructions stored thereon. The instructions, when executed by at least one processor of a respective computer device, cause the processor or multiple processors of the system to: while rendering a television program on a display screen, receive a command to view supplemental content associated with the rendered television program; subsequent to and in response to receiving the command, map an identity of the television program to a network address from which the supplemental content associated with the television program is retrievable; retrieve the supplemental content from a server resource as specified by the network address; and initiate display of the supplemental content on the display screen.

Another embodiment as discussed herein includes a computer readable storage medium and/or system having instructions stored thereon. The instructions, when executed by at least one processor of a respective computer device, cause the processor or multiple processors of the system to: render content received over a cable network channel on a display screen, the cable network channel allocated to distribute content originating from a content sponsor assigned to the cable network channel; in response to receiving a request to access supplemental content associated with the cable network channel: map an identity of the cable network channel currently displayed on the display screen to a network address of a server resource from which the supplemental content associated with the cable network channel is retrievable; retrieve the supplemental content from a server resource as specified by the network address; and initiate display of the supplemental content on the display screen.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in distributing main content as well as corresponding supplemental content in a cable network environments. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 5 is an example diagram illustrating a map according to embodiments herein.

FIG. 8 is an example diagram illustrating a content guide indicating available content and corresponding advanced interactive features for each multiple different programs according to embodiments herein.

DETAILED DESCRIPTION

Figure 1:
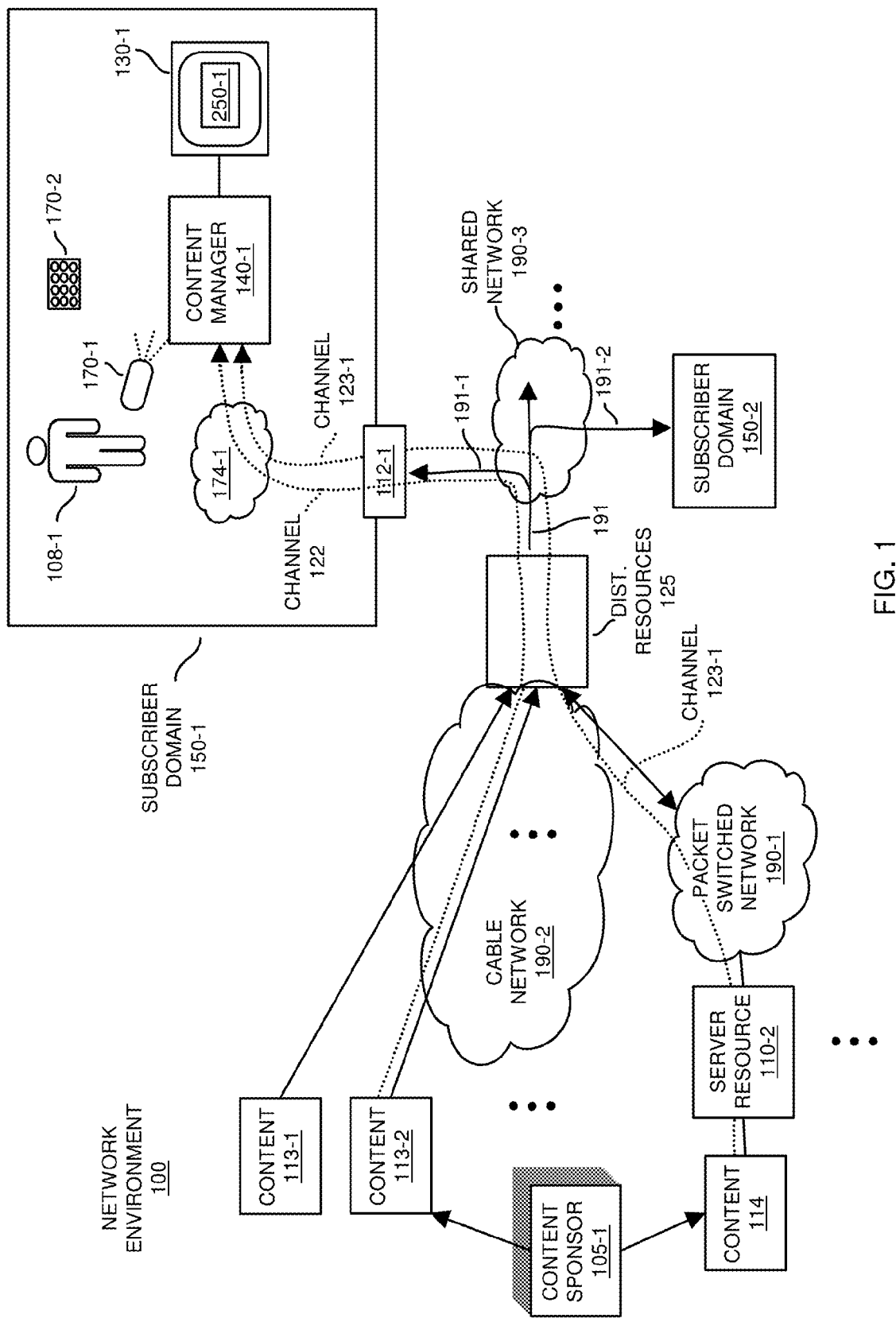
FIG. 1 is an example diagram illustrating a technique facilitating distribution of content from different sources according to embodiments herein.

Now, more specifically, FIG. 1 is an example diagram illustrating a network environment according to embodiments herein.

As shown, network environment 100 includes multiple networks including a packet-switched network 190-1, a cable network 190-2, shared network 190-3, etc. Via the different types of networks 190, respective subscribers are able to retrieve and playback different types of content such as over-the-top content, scheduled broadcast television programs, on-demand content, etc.

As its name suggests, packet-switched network 190-1 enables routing of data packets based on network address information. By way of a non-limiting example, packet-switched network 190-1 can support client server type communications. For example, a client can generate a request for content from a particular server resource using an appropriate network address of the server resource. The server resource transmits the requested content over packet-switched network 190-1 to the respective client in a subscriber domain using the network address of the client.

Cable network 190-2 supports services such as distribution of content via one or more cable television channels (e.g., QAM or quadrature amplitude modulated channels, IPTV channels, etc.) to subscribers in network environment 100.

Shared network 190-3 supports final leg connectivity to subscribers or subscriber domains 150 and includes physical media such as one or more coaxial cables, optical fibers, twisted wire pairs, etc.

Via distribution resources 125 (e.g., equipment such as cable modem termination systems, headend equipment, hubs, optical nodes, etc.), shared communication link 191 facilitates distribution of different types of content over shared communication link 191 to a respective service group of multiple subscriber domains 150. By way of a non-limiting example, a portion of bandwidth of shared communication link 191 can be allocated to broadcast content such as one or more television channels to subscribers in respective subscriber domains 150. Subscribers can selectively tune to the broadcasted television channels to view respective content.

The bandwidth associated with shared communication link 191 can also support distribution of additional content such as video on demand content. To retrieve such content, a subscriber generates a request for desired content. The distribution resource 125 allocates a new channel in the shared communication link 191 and transmits the requested content over the new channel. The requesting subscriber tunes to the newly established channel to retrieve the requested on-demand content.

As mentioned, content can be transmitted to the different subscribers in any suitable manner such as via QAM channels, IPTV channel, etc.

As mentioned, shared communication link 191 can be configured to support distribution of so-called over-the-top content. For example, a portion of bandwidth in shared communication link 191 can support data channels in accordance with DOCSIS (Data Over Cable Service Interface Specification) or any other suitable communication standard. Via the data channels, each of the subscribers can retrieve over-the-top content from respective server sources disposed in packet-switched network 190-1 such as the Internet.

An additional portion of the bandwidth of shared communication link 191 can be allocated to support miscellaneous services such as phone services. Thus, shared communication link 191 can support various services such as Internet access services, cable television services, phone services, etc.

In this example, subscriber domain 150-1 includes a content manager 140-1 such as a set-top box device, computer, etc. Content manager 140-1 can be any suitable type of playback device. Subscriber domain 150-1 can be configured to include network 174-1 such as a local area network, WiFi™ network, routers, etc., facilitating distribution of data and communications to and from subscriber domain 150-1. Interface 112-1 connects the respective subscriber domain 150-1 to shared network 190-3. Accordingly, the subscriber domain 150-1 is able to transmit and receive data.

User 108-1 resides in subscriber domain 150-1 and controls content manager 140-1 via input of commands from any of one or more controller devices 170 (e.g., controller device 170-1 such as a wireless set-top box remote controller, controller device 170-2 as a keyboard, etc.). The subscriber 108-1 can provide input commands to content manager 140-1 in accordance with any suitable technique.

As specified by the inputted commands, the content manager 140-1 controls playback of content received on any of one or more channels of the shared communication link 191.

Assume in this example that the subscriber 108-1 inputs a respective command to view content guide 250-1 on display screen 130-1. In response to the command, the content manager 140-1 initiates retrieval of display data associated with the content guide and displays content guide 250-1 on display screen 130-1.

Figure 2:
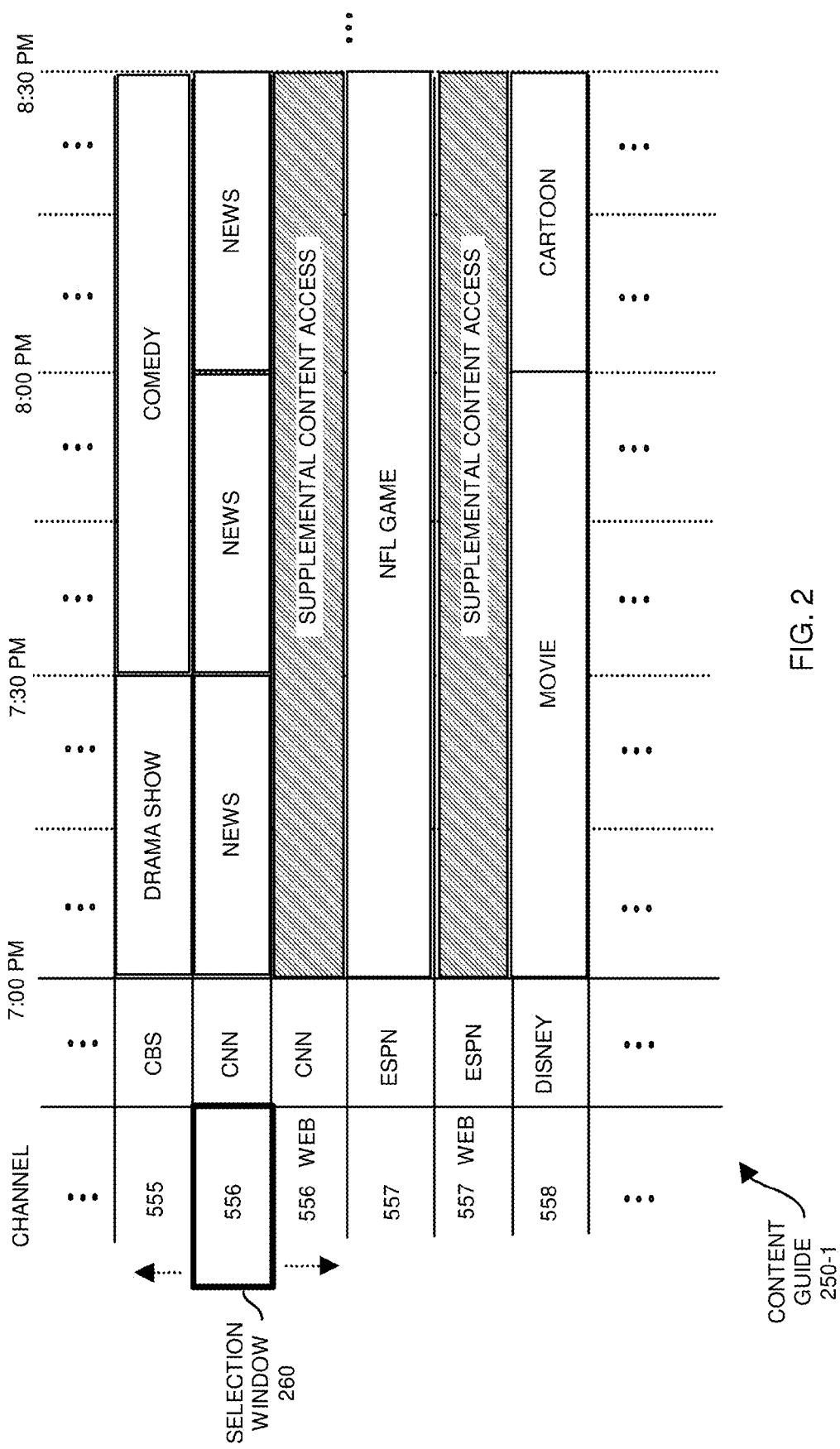
FIG. 2 is an example diagram illustrating display of a content guide according to embodiments herein.

A non-limiting example of content guide 250-1 is shown in FIG. 2. In this example embodiment, the content guide 250-1 displayed on display screen 130-1 includes a channel lineup of multiple selectable content viewing options.

Certain viewing options in the displayed content guide 250-1 correspond to available television channels that can be selected by the subscriber 108-1 for viewing. For example, assume that the current time is 7:01 pm. Via selection window 260, the subscriber can select channel 555 to view a drama show on television channel 555 (e.g., CBS™); the user can select channel 556 to view NEWS on television channel 556 (e.g., CNN™); the user can select channel 557 to view NFL GAME on television channel 557 (e.g., ESPN™); etc.

By way of a non-limiting example, the selection window 260 can be navigated up, down, left, right, etc., via respective arrow buttons on the control device 170-1. After highlighting a respective entry in content guide 250-1, the subscriber can press an OK button or selection button on the controller device 170-1 to confirm a selection.

Accordingly, embodiments herein can include: initiating display of a first channel viewing option or notification specifying playable content such as NEWS in scheduled timeslot 7:00-7:30 pm. of channel 556 as well as initiating display of a second channel viewing option (e.g., channel 556 WEB) specifying availability of the over-the-top content 114 via an auxiliary channel (e.g., 556 WEB) with respect to standard channel 556.

To select a respective channel in content guide 250-1, the respective subscriber 108-1 can navigate selection window 260 about displayed content guide 250-1. Subsequent to receiving selection of a respective channel in content guide 250-1, the content manager 140-1 tunes to the appropriate selected channel 122 (such as channel 556 in this instance) and plays back corresponding broadcasted content received on channel 556. Thus, via selection form content guide 250-1, the subscriber is able to select amongst multiple channels for viewing.

In this example embodiment, note that certain content sponsors (i.e., content providers) such as content sponsor CNN, content sponsor ESPN, etc., may produce additional content that is available over the Internet. Content guide 250-1 includes content viewing option 556 WEB enabling a respective user to view additional content associated with the CNN channel; content guide 250-1 includes content viewing option 557 WEB enabling a respective user to view additional content associated with the ESPN channel; and so on.

As a more specific example, each content sponsor may have a respective home page. Via selection of channel 556 WEB via selection window 260, the subscriber 108-1 can view a home page or any other suitable content associated with content sponsor CNN. Via selection of channel 557 WEB via selection window, the subscriber 108-1 can view a home page or any other suitable content associated with content sponsor ESPN.

The juxtaposition of displaying a respective television channel viewing option and a web channel viewing option adjacent or near each other in a content guide 250-1 is useful. For example, a subscriber may be interested in viewing content from a particular content sponsor such as CNN. Via the content guide 250-1, and display of multiple selectable viewing options (e.g., a standard television channel viewing option and related web content channel viewing option), the subscriber can easily, selectably, and efficiently view content from different sources for each of the content sponsors. Thus, in contrast to conventional techniques, a user can view content guide 250-1 and identify more options from the same content sponsor in a channel lineup.

Referring again to FIG. 1, display screen 130-1 initiates display of the content guide 250-1. Subscriber domain 150-1 receives one or more television channels of available content over termination branch 191-1 of shared communication link 191. By way of a non-limiting example, branch 191-1 is a final portion of a communication link connecting subscriber domain 150-1 to shared communication link 191.

Assume in this example that content sponsor 105-1 represents content sponsor CNN™ and that content 113-2 represents the NEWS program available in time slot 7:00-7:30 pm of channel 556. By way of a non-limiting example, the content sponsor 105 provides content 113-2 to the cable network service provider. The cable network service provider makes the content 113-2 available to subscribers.

As previously discussed, when the subscriber 108-1 (i.e., user) selects channel 556 for viewing, the content manager 140-1 tunes to channel 556, decodes the corresponding content stream, and plays back a rendition of the respective content on display screen 130-1 for viewing by the respective subscriber 108-1. Again, channel 556 can be any suitable type of channel such as a QAM channel, IPTV channel, video on demand channel, etc.

Further, as previously discussed, in certain instances, the subscriber 108-1 may wish to view alternative content 114 (i.e., supplemental content) such as over-the-top content, web content, etc., provided by or made available by the content sponsor 105 (e.g., CNN) or any other suitable resource. In such an instance, in response to receiving selection of channel 556 WEB, the content manager 140-1 initiates communications over a respective data channel such as data channel 123-1 (e.g., an IP channel, Internet channel, etc.) in shared communication link 191.

By way of a non-limiting example, to retrieve content 114 such as home page associated with the content sponsor CNN™, the content manager 140-1 produces a request message including a network address of the server resource 110-2 from which the content 114 associated with content sponsor 105-1 is retrievable. The content manager 140-1 communicates the request message (e.g., one or more IP data packets) through the data channel to server resource 110-2. The content manager 140-1 decodes and renders the content 114 (e.g., streaming video, home page, etc.) received from server resource 110-2 on display screen 130-1 for viewing by the respective subscriber 130-1.

Accordingly, network environment 100 and corresponding infrastructure enables a respective content sponsor to distribute content to a respective subscriber from a number of different sources in network environment 100. Additional details are discussed below.

Figure 3:
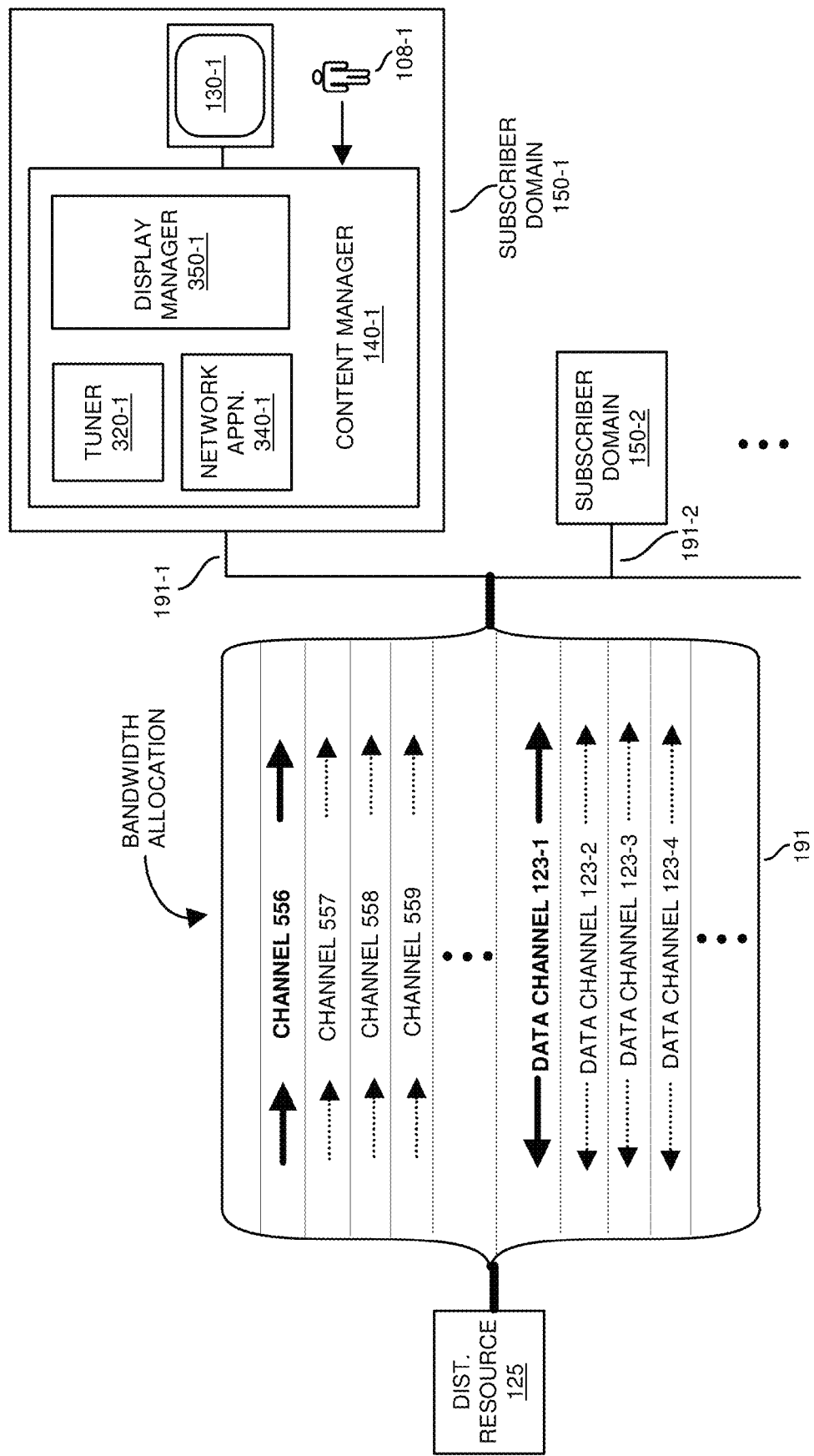
FIG. 3 is an example diagram illustrating bandwidth allocation of different types of channels in a shared communication link according to embodiments herein.

FIG. 3 is an example diagram illustrating bandwidth allocation according to embodiments herein.

As previously discussed, the bandwidth of the shared communication link 191 can be allocated to include one or more channels (e.g., scheduled television channels, video on demand channels, etc.). In this example embodiment, bandwidth of shared communication link 191 can include channels . . . , 556, 557, 558, 559, . . . .

Assume that channel 556 includes content 113-2 from content sponsor CNN; channel 557 includes content from content sponsor ESPN; and so on.

Shared communication link 191 can also include one or more data channels 123-1, 123-2, 123-3, 123-4, etc., to carry over-the-top such as IP (Internet Protocol) data traffic. Subscribers in network environment 100 are coupled to shared communication link 191 can share use of the data channels to retrieve web content.

In this example embodiment, the content manager 140-1 includes a tuner resource 320-1. In a manner as previously discussed, the user can select a standard television channel from which to view a broadcast of streaming video content. In response to receiving selection of channel 556, the content manager 140-1 sets tuner resource 320-2 to tune to channel 556. Display manager 350-1 decodes the received data on channel 556 and renders playback of the corresponding content 113-2 on display screen 130-1.

Via selection window 260, the subscriber 108-1 may also select 556 WEB. In accordance with one embodiment, responsive to receiving selection of this channel viewing option (i.e., channel 556 WEB), the content manager 140-1 retrieves an appropriate network address specifying the server resource 110-2 from which the content 114 (such as a home page or other type of content associated with sponsor CNN) can be retrieved.

The network application 340-1 (such as a web browser or other suitable type of resource) utilizes the network address of content sponsor CNN to communicate with the server resource 110-2 over an auxiliary channel (e.g., channel 556 WEB or channel 123-1) with respect to main channel 556.

Note that in one embodiment, the network application 340-1 such as a browser can be opened or executed well before receiving a request to access corresponding web content.

The network application 340-1 transmits the content request message over the auxiliary channel to retrieve display information such as content 114 generated by the content sponsor 105 or other suitable resource. The network application 340-1 receives the display information over the auxiliary channel from the server resource 110-2. The display manager 350-1 decodes and renders the display information (e.g., content 114) on the display screen 130-1.

In a similar manner, each of the subscribers in respective subscriber domains 150 of network environment 100 can retrieve and playback content from multiple different sources for a particular content provider (e.g., content sponsor).

As previously mentioned, network application 340-1 can be a browser application supporting retrieval of over-the-top content. The network application 340-1 can retrieve and transmit content (e.g., documents, web pages, video data, audio data, images, etc.) in accordance with a communication protocol such as Hypertext Transfer Protocol (HTTP) HTTP or any other suitable communication protocol. As will be further discussed below, additional displayed viewing options such as hyperlinks present in the information displayed on display screen 130-1 enable the subscriber to navigate to other websites, retrieve different types of content, etc.

Accordingly, a respective subscriber can select a standard television channel to view standard broadcast content associated with a content sponsor. The subscriber can select an auxiliary channel to access supplemental content made available by a respective content sponsor.

Figure 4:
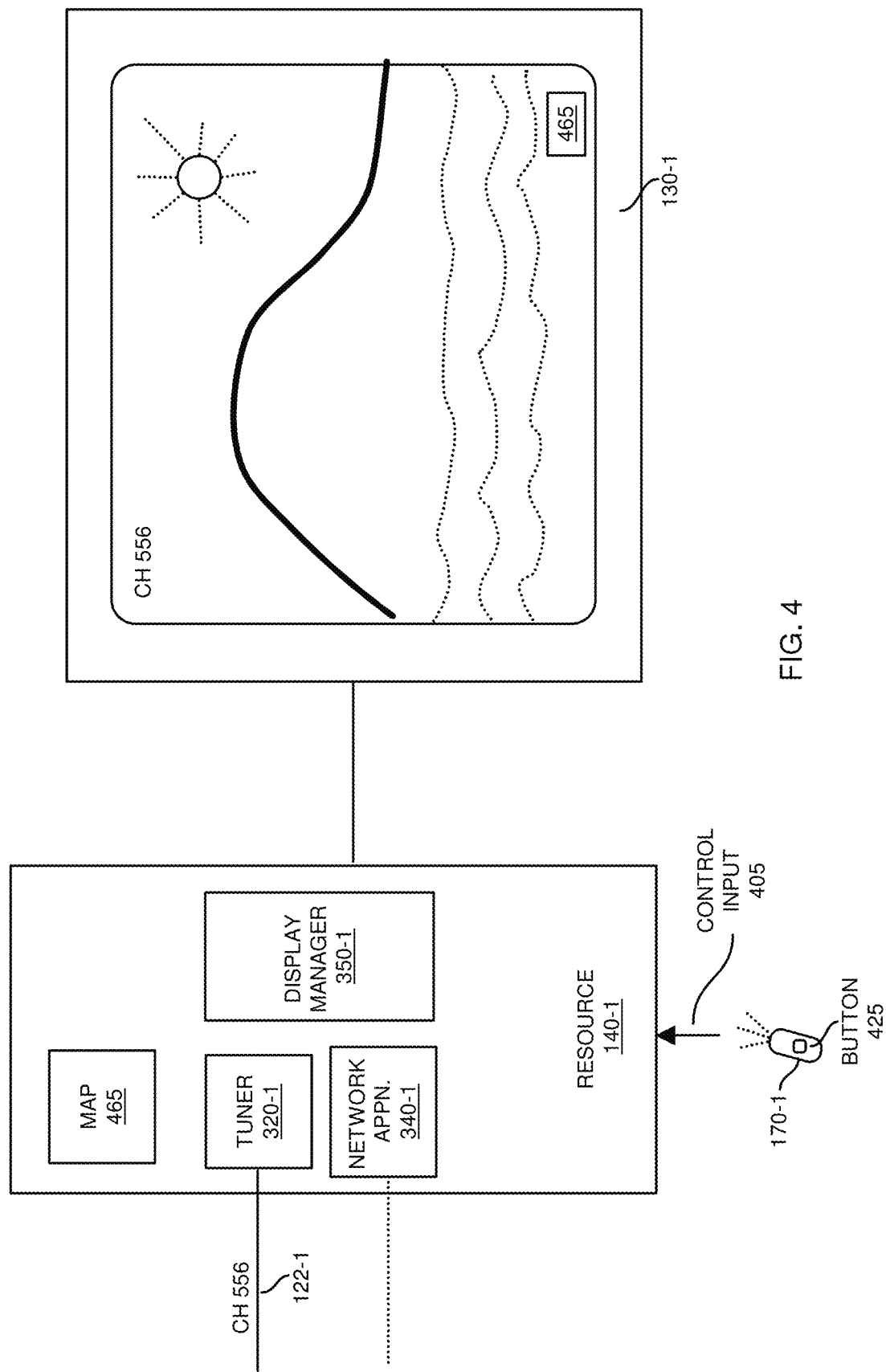
FIG. 4 is an example diagram illustrating playback of a selected channel of content according to embodiments herein.

FIG. 4 is an example diagram illustrating transition of displaying content received on a television channel to an auxiliary channel according to embodiments herein.

In a manner as previously discussed, assume that the subscriber initially produces control input 405 indicating to tune to channel 556 and render corresponding content 113-2 provided by content sponsor 105 on display screen 130-1.

Assume that during playback of respective content 113-2 received on channel 556, the subscriber 108-1 would like to switchover to viewing and/or accessing supplemental content such as web content 114 associated with channel 556. Assume in this example that the subscriber 108-1 provides control input 405 such as by pressing an appropriate button 425 on controller device 170-1.

While rendering content 113-2 from channel 556, assume that the subscriber 108-1 presses button 425. In response to receiving the control input 405 as a result of the button 425 being pressed, the content manager 140-1 utilizes map 465 to map the currently viewed channel (i.e., channel 556 associated with content sponsor CNN) to a corresponding network address or URL (Uniform Resource Locator) to retrieve the corresponding supplemental content 114 for playback on display screen 130-1.

FIG. 5 is an example diagram illustrating a map 465 according to embodiments herein. In one embodiment, the content manager 140-1 keeps track of the currently selected channel (i.e., channel 556 in this instance). Via map 465, the network application 340-1 determines that supplemental web content (such as content 114) associated with channel 556 and/or content sponsor CNN can be retrieved from a URL such as CNN.COM (or corresponding unique IP network address #1).

The network application 340-1 uses the identified network address and/or URL (e.g., network application #1) to obtain the supplemental content 114 from server resource 110-2.

Figure 6:
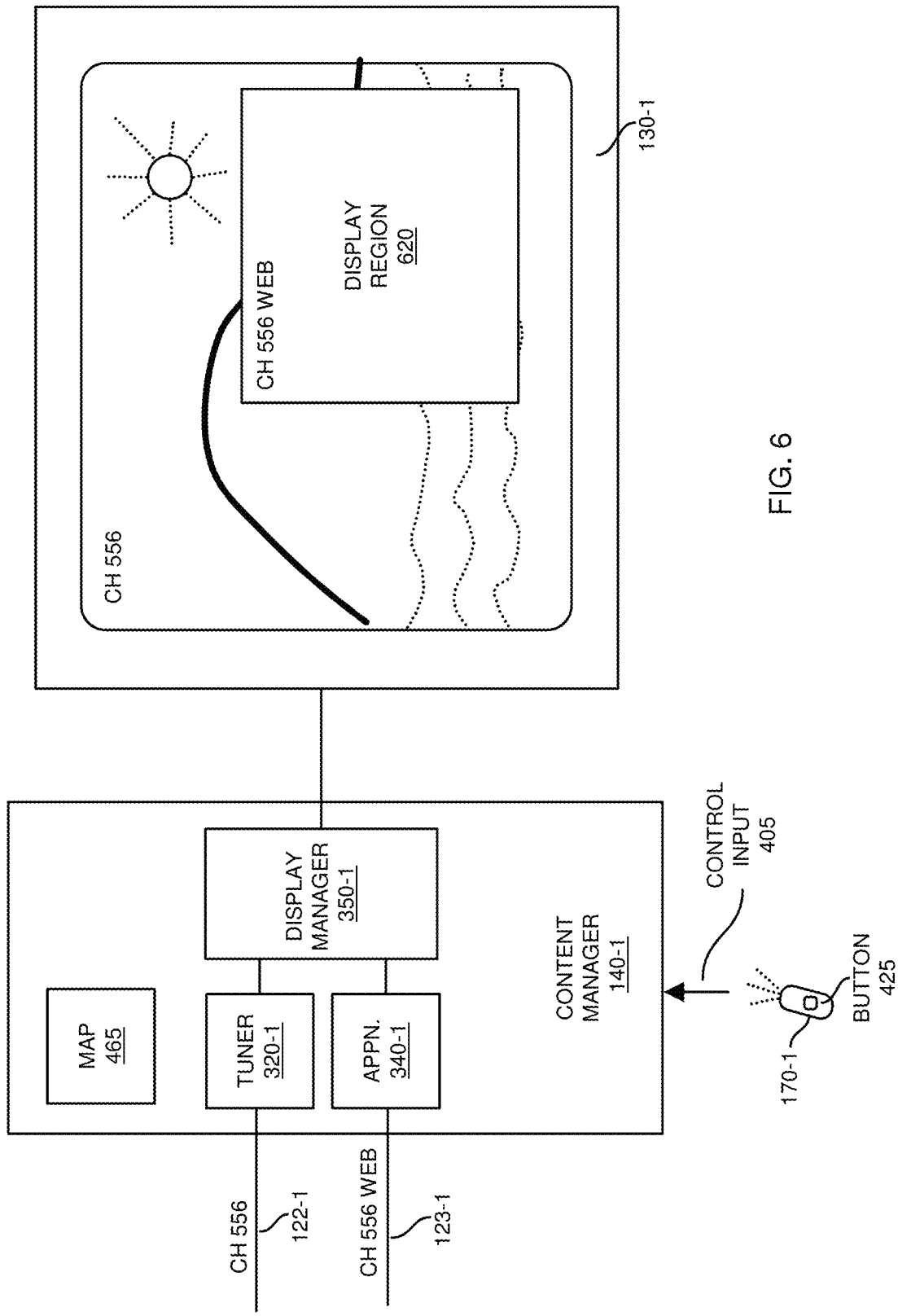
FIG. 6 is an example diagram illustrating display of related web content in response to receiving a request to display the related web content for the currently selected channel according to embodiments herein.

As further shown in FIG. 6, in response to receiving the command (such as depressing of button 425) to retrieve and display content 114 associated with channel 556 WEB, the display manager 350-1 switches into a mode of displaying a rendition of retrieved supplemental content 114 (as retrieved over auxiliary channel 556 WEB by network application 340-1) in display region 620 on display screen 130-1.

Note that FIG. 6 illustrates an example of a picture-in-picture mode in which the display manager 350-1 displays a rendition of the supplemental content 114 received from channel 556 WEB in a portion of the display screen as an overlay on top of a rendition of content 113-2 from channel 556 as a background on display screen 130-1.

As an alternative to displaying a picture-in-picture mode as in FIG. 6, the display manager 350-1 can be configured to discontinue playing back content 113-2 and display a rendition of supplemental content 114 over the entire field of pixels in the display screen 130-1.

By further way of a non-limiting example, whether in a picture-in-picture mode or an alternating display mode (in which either a rendition of content from channel 556 is displayed or content from channel 556 WEB is displayed), if supplemental content is associated with a respective viewed channel, note that the button 425 of controller device 170-1 can be used to toggle between playing back streaming content 113-2 received on channel 556 and playing back corresponding supplemental content associated with the channel.

More specifically, while displaying a rendition of content 113-2 on display screen 130-1 from channel 556, selection of the button 425 causes the display manager 350-1 to switch over to (alternatively or additionally) displaying a rendition of supplemental content 114 (such as a home page or other suitable content) on display screen 130-1. While displaying a rendition of content 114 on display screen 130-1 from an over-the-top channel such as auxiliary channel 556 WEB, selection of the button 425 can cause the display manager 350-1 to switch over to displaying a rendition of content 113-2 on display screen 130-1 again.

Accordingly, in one embodiment, a user such as subscriber 108-1 can easily toggle between modes of playing back content from different sources for a particular content provider merely by repeatedly pressing the button 425.

In yet further embodiments, the content 112-2 received on the main television channel (e.g., channel 556) can be recorded in a digital video recorder. As mentioned, the subscriber 108-1 can temporarily switchover to viewing the available supplemental web content received over the auxiliary channel (e.g., channel 556 WEB). In response to detecting that a user switches back to viewing the main television channel again after temporarily viewing the supplemental content, the display manager 340-1 can initiate playback of stored broadcast content so that the subscriber 108-1 is able to view an entirety of the content 112-2, as opposed to skipping playback of parts of the content 112-2 due to times when the user happened to view content received of the auxiliary channel 556 WEB.

Thus, certain embodiments herein can include storing a program of currently viewed content 112-2 as received on channel 556; in response to detecting switchover to viewing content on channel 556 WEB, storing a pointer in a respective video stream of the stored content, the pointer specifying a playback time at which the user switches over to the auxiliary channel 556 WEB; and upon switchover back to viewing the main television channel or stored content 112-2, playing back the stored content starting at the time as specified by the pointer. As mentioned, the subscriber is able to view a television program in its entirety even though the subscriber happens to at least temporarily switch over to viewing supplemental content associated with a currently viewed television program or channel.

Figure 7:
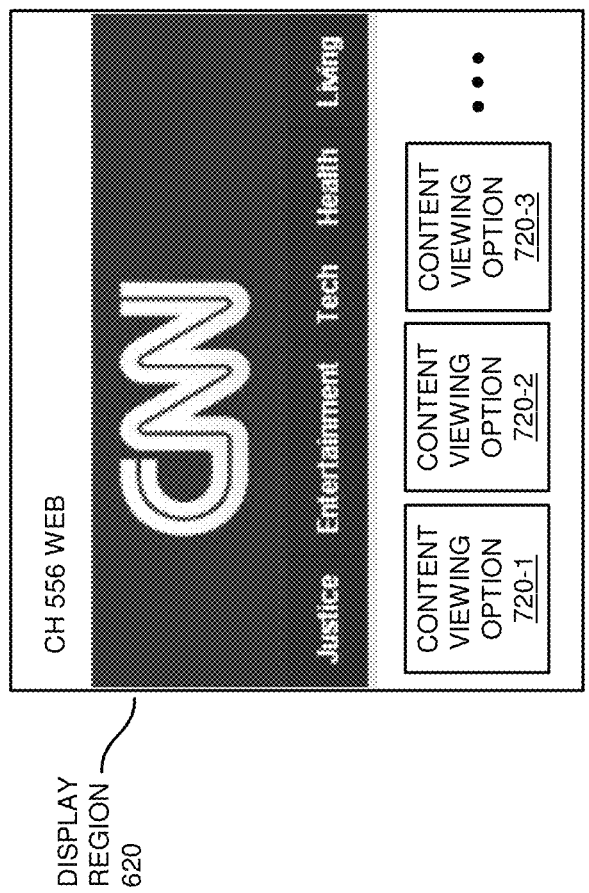
FIG. 7 is a more specific example diagram illustrating display of retrieved over-the-top content associated with a corresponding television channel according to embodiments herein.

FIG. 7 is an example diagram illustrating a rendering of over-the-top content associated with a television channel according to embodiments herein.

As previously discussed, the user can initiate display of content associated with channel 556 WEB on display screen 130-1. In this example embodiment, assume that the content manager 140-1 receives a request to display content associated with channel 556 WEB. In such an instance, the display manager 340-1 initiates display of content 114 in display region 620 as shown.

The rendering of supplemental content (associated with a television program or content provider) in display region 620 can include displaying a menu of further selectable content viewing options 720 such as content viewing option 720-1, content viewing option 720-2, content viewing option 720-3, and so on. Each of the content viewing options 720 can correspond to further retrievable supplemental over-the-top content accessible by the subscriber 108-1.

By way of a non-limiting example, the rendition of content in display region 620 may be a web home page of the CNN content sponsor. The subscriber 108-1 can initiate selection of content viewing option 720-1 to retrieve further display information over the auxiliary channel 556 WEB (e.g., a data channel) for viewing in display region 620 on display screen 130-1; the subscriber 108-1 can initiate selection of content viewing option 720-2 to retrieve further display information over the auxiliary channel 556 WEB (e.g., a data channel) for viewing in display region 620 on display screen 130-1; and so on.

Accordingly, embodiments herein can include initiating display of a set of selectable content viewing options 720 on the display screen 130-1 in which each of the content viewing options 720 specifies different content available for selection and retrieval over the auxiliary channel; and in response to selection of a given content viewing option from the set of displayed content viewing options 720, initiating a communication over the auxiliary channel to a respective server resource to retrieve content as specified by the given content viewing option.

FIG. 8 is an example diagram illustrating an example of another version of a content guide according to embodiments herein.

In this example embodiment as shown, the content guide 250-2 indicates availability of corresponding web content for each of multiple different television programs as opposed to merely that web content such as a respective home page or other supplemental content is available from a particular content sponsor.

For example, as shown in FIG. 8, content guide 250-2 indicates that television program "GERALDO SHOW LIVE" supports interactive television.

In one embodiment, content guide 250-2 indicates that supplemental content is available from channel 567 WEB for television program "GERALDO SHOW LIVE" in timeslot between 7:00 and 8:00 pm; content guide 250-2 indicates that supplemental content is available from channel 556 WEB for television program "LIVE INTERVIEW WITH TED TURNER" in timeslot between 8:00 and 9:00 pm; content guide 250-2 indicates that supplemental content is available from channel 567 WEB for television program "AMERICAN IDOL" in timeslot between 9:00 and 10:00 pm; and so on.

A corresponding unique network address from which to retrieve web content for a television program can be assigned to each of the programs. For example, a first set of one or more unique network addresses from which to retrieve supplemental content associated with the "GERALDO SHOW LIVE" can be assigned to the "GERALDO SHOW LIVE" aired in channel 567 during timeslot 7:00 to 8:00 pm.

In a manner as previously discussed, a respective subscriber can tune to view a respective television program such as "GERALDO SHOW LIVE." Note that the network application 340-1 can be executing well before a time of actually initiating an access of web content such as at or around a time of powering up the content manager 140-1 for use. Early execution of the network application 340-1 can reduce delays of retrieving corresponding supplemental content when so requested by a subscriber.

Note that display of notifications in the content guide is one way that a respective subscriber can be notified that supplemental content is available for a respective television program. However, in one embodiment, the subscriber 108-1 may not need to view the content guide 250-2 to learn that corresponding web content associated with a television program is available for retrieval.

For example, the network application 340-1 in content manager 140-1 can be configured to monitor a current viewed channel to which tuner resource 320-1 is tuned. The content manager 140-1 can be configured to check whether a particular selected channel being played back on display screen 130-1 has corresponding web content available for viewing. If so, the display manager 350-1 provides a notification to a subscriber by initiating display of a visual notification such as a symbol on the display screen 130-1 to notify the subscriber 108-1 that web content is available for the currently selected television program.

Assume in this example that the subscriber 108-1 selects the television program "GERALDO SHOW LIVE" on channel 567 for display on display screen 130-1. In a manner as previously discussed, the tuner 320-1 tunes to channel 567 and renders the selected television program on display screen 130-1. While the "GERALDO SHOW LIVE" is played back by content manager 140-1, the display manager 350-1 can be configured to initiate display of a symbol in a small portion of the display screen 130-1 to notify the subscriber 108-1 that web content associated with the displayed television program is available.

Assume further in this example that the subscriber 108-1 provides input such as pressing button 425 to access the web content associated with the "GERALDO SHOW LIVE." In response to receiving a command such as a subscriber 108-1 pressing button 425 to access web content associated with the "GERALDO SHOW LIVE," the network application 340-1 accesses a respective map to identify a corresponding network address from which web content associated with the currently displayed channel can be retrieved. Via communications with respect to a server resource as specified by the network address, the network application 340-1 retrieves the supplemental content such as web content associated with the "GERALDO SHOW LIVE" and initiates display of the corresponding supplemental content on the display screen 130-1.

Accordingly, a subscriber 108-1 can initially select and view content in a scheduled time of a television channel. The user can view additional content (e.g., custom or generic over-the-top content) associated with the selected television program via input of an appropriate display command such as pressing button 425 on control device 170-1.

The communication channel (e.g., a client server channel) used by the network application 340-1 to retrieve the supplemental content can be used for a number of purposes such as interactive television. For example, the retrieved web content can enable a respective user to participate in a poll associated with the corresponding main television program.

As previously discussed, the supplemental content facilitating interactive television can be displayed on display screen 130-1 as a picture-in-picture. In one embodiment, via input to a poll received over channel 567 WEB and presented picture-in-picture window on the display screen 130-1, the subscriber 108-1 can provide feedback indicating whether the subscriber believes that a male guest currently interviewed on the "GERALDO SHOW LIVE" (as captured in video received and played back from the main channel 567) is telling the truth or not about a particular subject matter discussed several minutes earlier on the show played back on the display screen 130-1 (e.g., from channel 567).

The content provider of the "GERALDO SHOW LIVE" can tally results of the poll from multiple different subscribers (as received in a similar manner via interactive television), and posts results later in the television show broadcasted on channel 567. For example, via collection of information from different subscribers via the auxiliary channel providing web access, a data collection manager in the corresponding server resource associated with channel 567 WEB can determine that 75% of the audio viewing the "GERALDO SHOW LIVE" and taking the poll thinks that the male guest is lying about a subject such as cheating on his girlfriend. The corresponding content sponsor can play back the results of the poll on the show after tallying results.

Accordingly, embodiments herein can include receiving feedback from multiple subscribers with respect to television program; and producing a portion of the television program viewed by the subscriber to include the feedback.

Thus, a respective network application 340-1 can support two-way communications amendment interactive television. For example, display information can be retrieved from a particular web site and displayed on display screen 130-1 as supplemental content. In a reverse direction, the subscriber 108-1 can input data to the respective website to participate in the television program.

In accordance with yet further embodiments, the supplemental web content associated with a respective television channel can vary depending on which particular portion of the television program is being broadcasted to subscribers. For example, via the network application 340-1, a respective subscriber may be able to use the network application 340-1 to participate in a poll during first portion of a broadcast. During another portion of the broadcast, via communications over a respective auxiliary WEB channel for a program, the respective subscriber may be able to participate in the show as if they were present in the audience; and so on.

Figure 9:
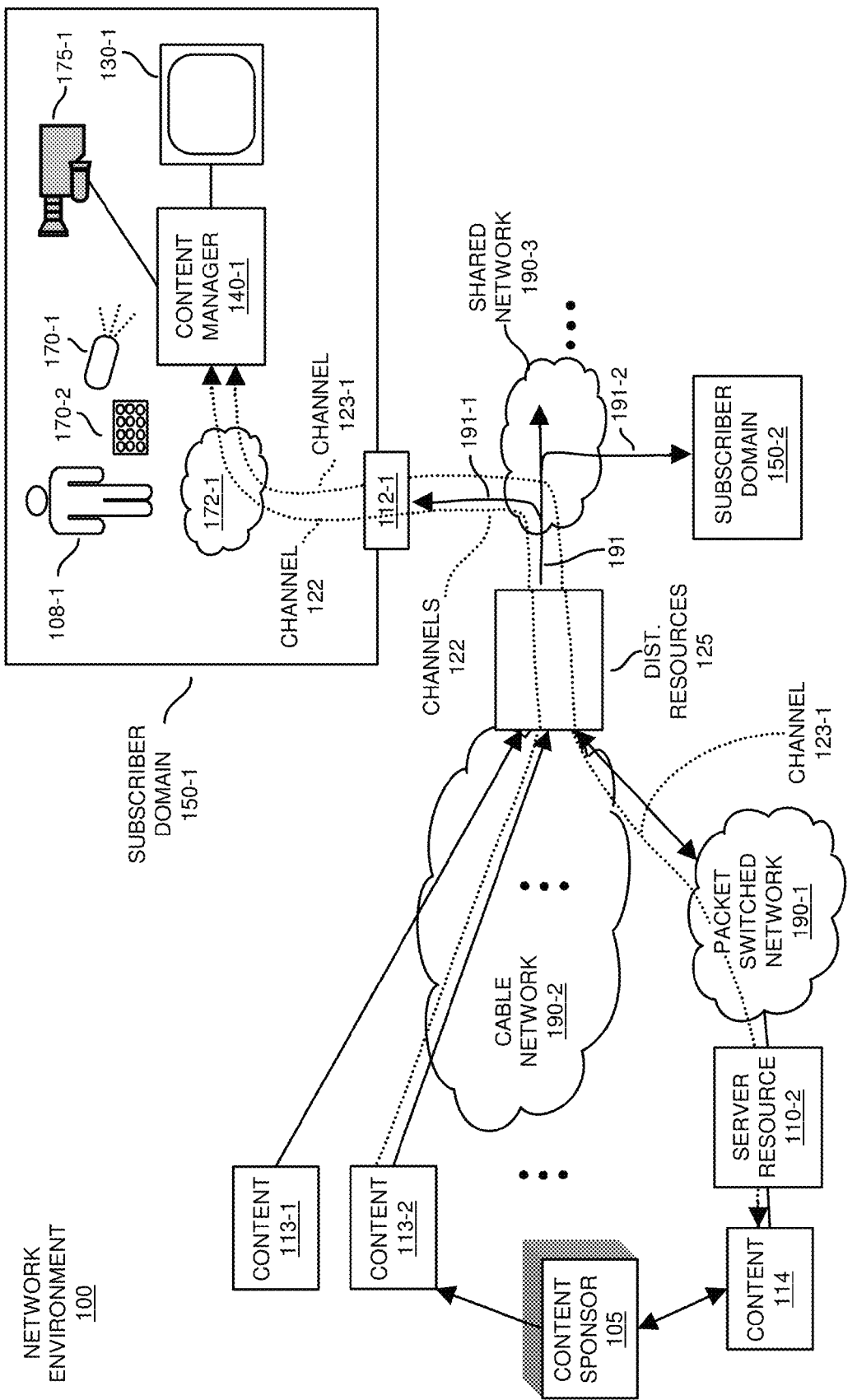
FIG. 9 is an example diagram enabling viewer participation in a television program according to embodiments herein.

FIG. 9 is an example diagram enabling further viewer participation in a television program according to embodiments herein.

As shown, the subscriber domain 150-1 can be equipped with a respective camera resource 175-1 (e.g., an audio and image capturing device) to monitor the subscriber 108-1. In one embodiment, network application 340-1 transmits the captured images/audio to server resource 110-2 that stores the content. The corresponding content sponsor can receive the captured images/audio and initiate playback of such content in the corresponding television program. Accordingly, the host of "GERALDO SHOW LIVE" can interview a subscriber 108-1 at a remote location (such as in their home) and display the results of the home interview later in the corresponding broadcasted television program. Thus, subscribers in their respective homes can participate in a respective television show even though they are not physically present in an audio.

Figure 10:
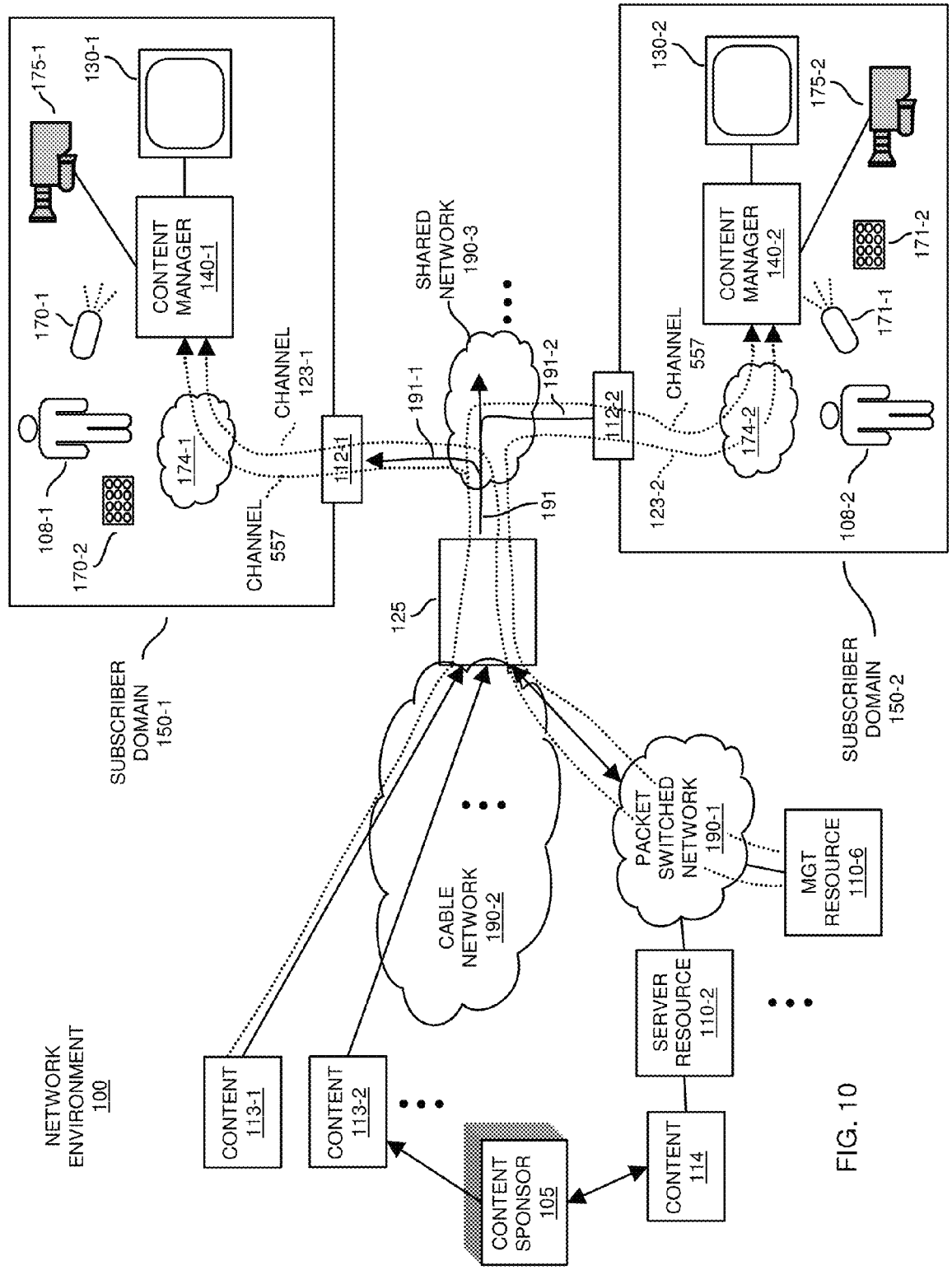
FIG. 10 is an example diagram illustrating social participation in a television program according to embodiments herein.

FIG. 10 is an example diagram illustrating the ability for subscribers to communicate with other subscribers according to embodiments herein.

As shown, each of the multiple subscriber domains 150 can be equipped with a respective camera resource. For example, subscriber domain 150-1 can be equipped with camera resource 175-1 to capture audio/images in subscriber domain 150-1; subscriber domain 150-2 can be equipped with camera resource 175-2 to capture audio/images in subscriber domain 150-2; and so on.

Each content manager 140 in a subscriber domain can be configured to monitor playback of particular content selected for viewing by a respective subscriber. When the subscriber tunes to a particular predetermined channel or television program, the network application in each content manager can be configured to access management resource 110-6 to determine whether the subscriber's one or more friends also happen to be watching the same television show. Management resource 110-6 can be configured to keep track of which subscribers in network environment 100 are open to receiving communications from each other. Assuming that subscriber 108-1 and subscriber 108-2 are friends with each other, in one embodiment, the management resource 110-6 communicates a message to the parties to indicate that they can communicate with each other via a video session.

More specifically, assume that subscriber 108-1 and subscriber 108-2 are friends that enjoy watching football.

Assume further that management resource 110-6 keep track of the relationship between subscriber 108-1 and subscriber 108-2. Each content manager 140 can be configured to monitor when a respective subscriber watches a football game.

By way of a non-limiting example, in response to detecting that subscriber 108-1 has tuned to channel 557 to watch the football game starting at 7:00 pm (FIG. 2), the network application 340-1 in content manager 140-1 contacts management server 110-6 to indicate that subscriber 108-1 is currently watching the football game (or particular channel). In a similar manner, each of multiple subscribers can notify the management resource 110-6 of the corresponding channel they are watching. In this example, assume that subscriber 108-2 has also tuned to view the football game on channel 557.

In response to detecting that subscriber 108-1 has tuned to channel 557 to watch the football game starting at 7:00 pm (FIG. 2) as well, the network application 340-1 in content manager 140-1 contacts management server 110-6 check if any friends of subscriber 108-2 happen to be watching the same football game (or channel). If so, the management resource 110-6 can communicate through the respective network applications to notify one or more of the subscribers (e.g., subscriber 108-1 and/or subscriber 108-2) that a respective friend is watching the same game.

Via further communications with the management resource, if both subscriber 108-1 and subscriber 108-2 are open to communications with each other, the subscriber 108-1 and subscriber 108-2 can facilitate transmission of images to each other. For example, the network application in content manager 140-1 can send the audio/images of subscriber 108-1 as captured by camera resource 175-1 over the web channel to management resource 110-6. Management resource 110-6 forwards the audio/images of the subscriber 108-1 as captured by camera resource 175-1 to the network application in content manager 140-2 that displays the images/audio as a picture-in-picture over the football game rendered in display screen 130-2.

In a reverse direction, the network application in content manager 140-2 can send the audio/images of subscriber 108-2 as captured by camera resource 175-2 over a respective web channel to management resource 110-6. Management resource 110-6 forwards the audio/images of the subscriber 108-2 as captured by the camera resource 175-2 to the network application in content manager 140-1 that displays the images/audio as a picture-in-picture over the football game rendered in display screen 130-1.

Accordingly, each subscriber can view the other subscriber and communicate with each other while watching the same football game.

Figure 11:
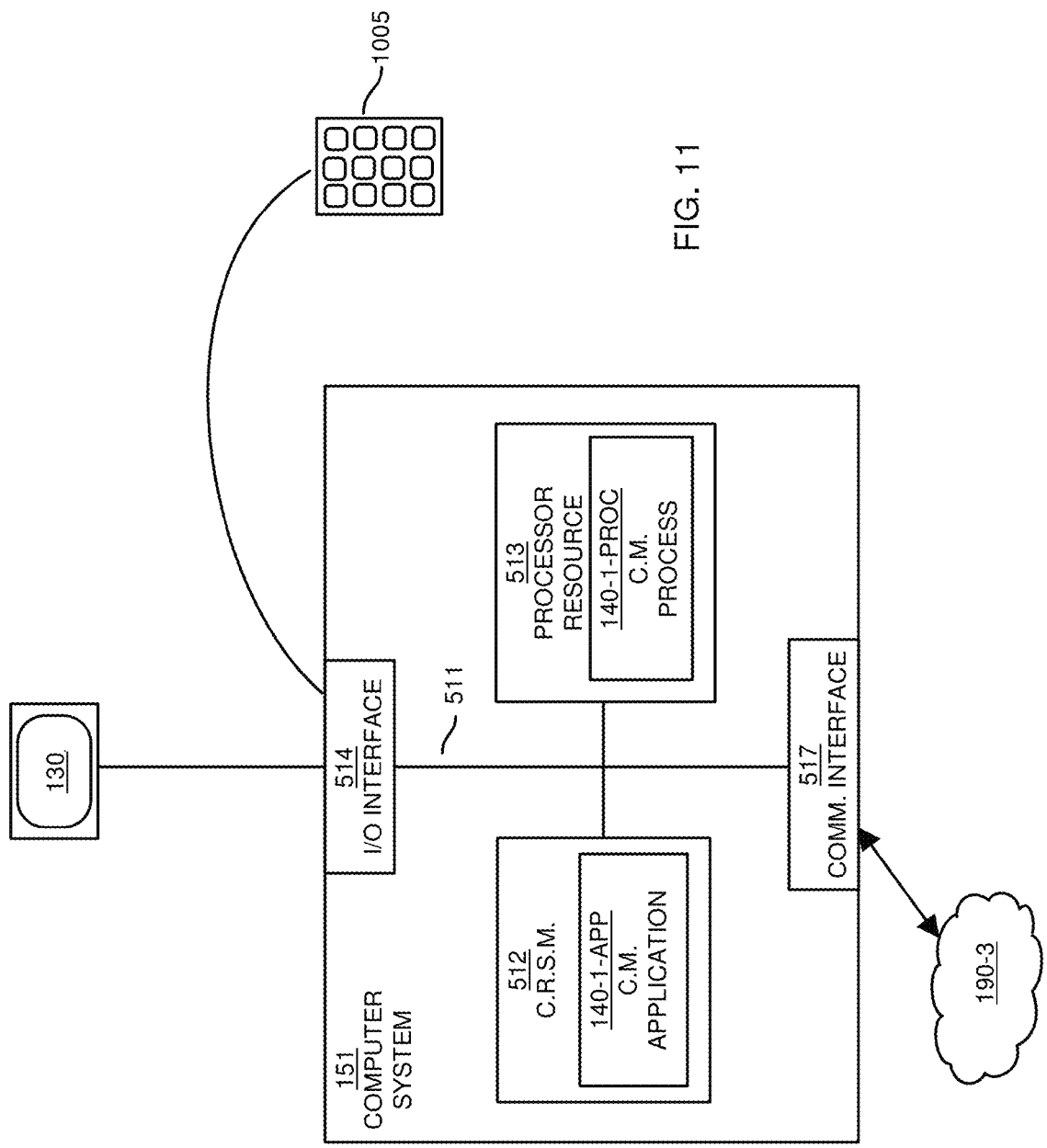
FIG. 11 is an example diagram illustrating a computer architecture executing one or more embodiments as discussed herein.

FIG. 11 is an example diagram illustrating a computer architecture in which to execute one or more embodiments as discussed herein.

Any of the different processing techniques can be implemented via execution of software code on a computer system.

For example, as shown, computer system 151 (e.g., a computer device) of the present example can include an interconnect 511 that couples computer readable storage media 512 such as a non-transitory type of media (i.e., any type of hardware storage medium) in which digital information can be stored and retrieved. The computer system 151 can further include processor resource 513 (e.g., one or more processor devices), I/O interface 514, communications interface 517, etc.

As its name suggests, I/O interface 514 provides connectivity to external resources or devices control devices 170, one or more display screens 130, etc.

Computer readable storage medium 512 can be any hardware storage device to store data such as memory, optical storage, hard drive, floppy disk, etc. In one embodiment, the computer readable storage medium 512 stores instructions and/or data.

Communications interface 517 enables the computer system 151 and one or more processor resource 513 to communicate over a resource such as network 190-3. I/O interface 514 enables processor resource 513 to perform functions such as receive control input from a respective subscriber, control a respective display screen, etc.

As shown, computer readable storage media 512 can be encoded with content manager application 140-1-APP (e.g., software, firmware, etc.) executed by processor resource 513. Content manager application 140-1-APP can be configured to include instructions to implement any of the operations as discussed herein.

During operation of one embodiment, processor resource 513 accesses computer readable storage media 512 via the use of interconnect 511 in order to launch, run, execute, interpret or otherwise perform the instructions in content manager application 140-1-APP stored on computer readable storage medium 512.

Execution of the content manager application 140-1-APP produces processing functionality such as content manager process 140-2-PROC in processor resource 513. In other words, the content manager process 140-2-PROC associated with processor resource 513 represents one or more aspects of executing content manager application 140-1-APP within or upon the processor resource 513 in the computer system 151.

Those skilled in the art will understand that the computer system 151 can include other processes and/or software and hardware components, such as an operating system that controls allocation and use of hardware resources to execute content manager 140-1-APP.

In accordance with different embodiments, note that computer system may be any of various types of devices, including, but not limited to, a set-top box, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 151 may reside at any location or can be included in any suitable resource in network environment 100 to implement functionality as discussed herein.

Functionality supported by the different resources will now be discussed via the flowchart in FIGS. 12-14. Note that the steps in the flowcharts below can be executed in any suitable order.

Figure 12:
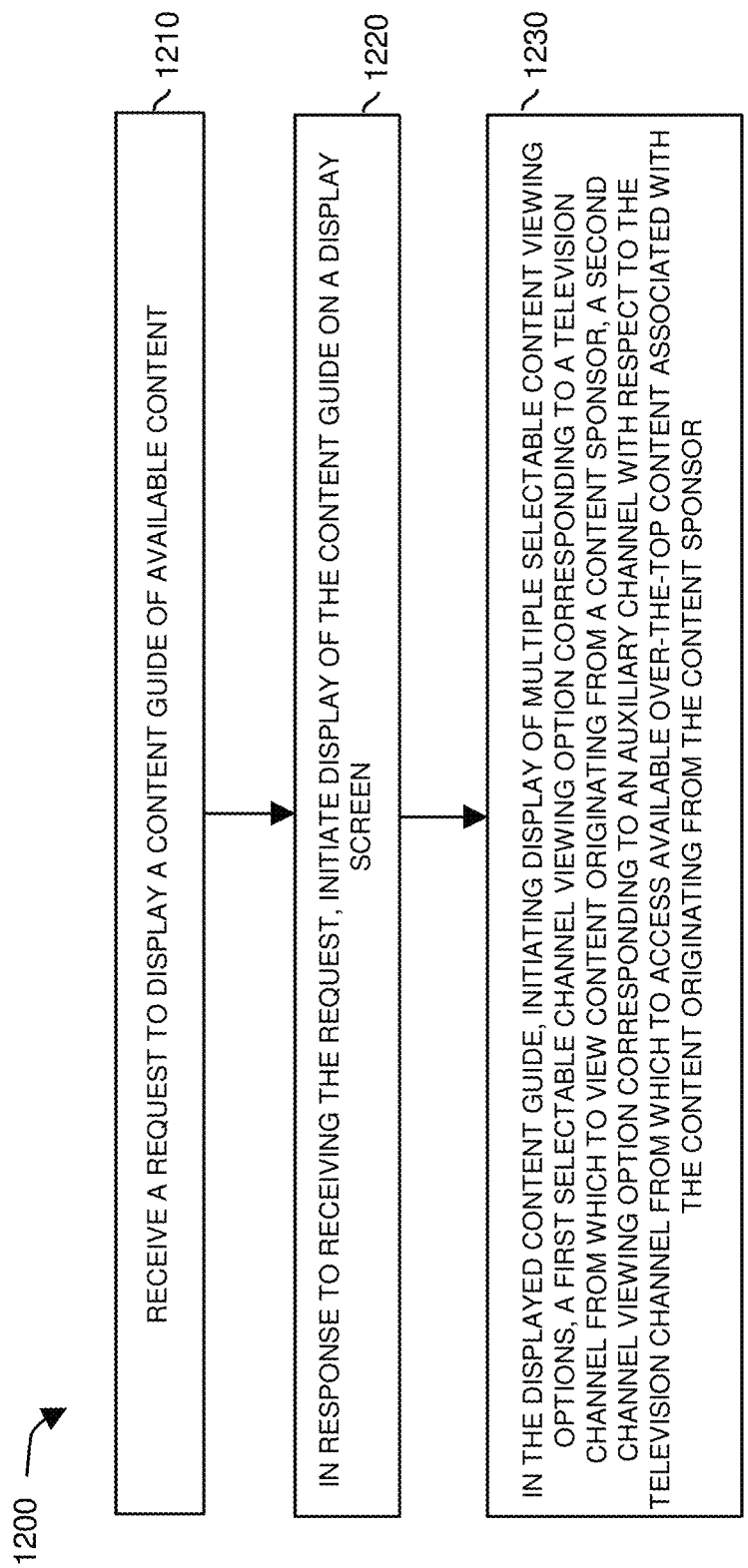
FIG. 12 is a flowchart illustrating an example method of providing notification of supplemental content associated with one or more television channels in a content guide according to embodiments herein.

FIG. 12 is a flowchart 1200 illustrating an example method facilitating interactive television according to embodiments. Note that there will be some overlap with respect to concepts as discussed above.

In processing block 1210, the content manager 140-1 receives a request to display a content guide 250 of available content.

In processing block 1220, in response to receiving the request, the content manager 140-1 initiates display of the content guide 250-1 on a display screen 130-1.

In processing block 1230, in the displayed content guide 250-1, the content manager 140-1 initiates display of multiple selectable content viewing options. A first selectable channel viewing option (such as channel 556) corresponds to a television channel from which to view content 113-2 originating from a content sponsor 105-1. A second channel viewing option corresponds to an auxiliary channel (e.g., 556 WEB) with respect to the television channel from which to access available over-the-top content 114 associated with the content 113-2 originating from the content sponsor 105-1. Content originated by the content sponsor 105-1 includes any content provided by or made available by the content sponsor 105-1.

Figure 13:
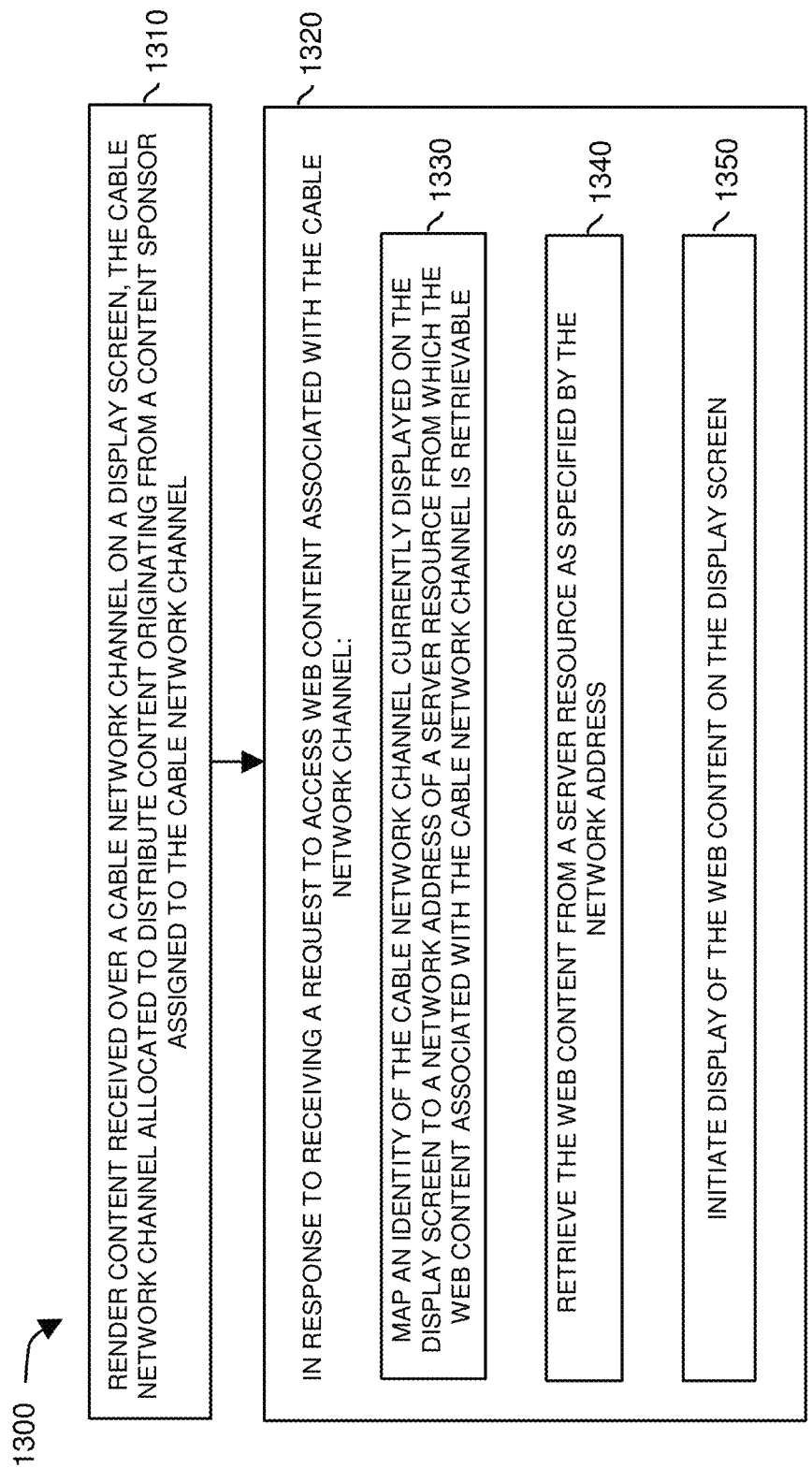
FIG. 13 is a flowchart illustrating an example method of providing notification of the availability of supplemental content according to embodiments herein.

FIG. 13 is a flowchart 1300 illustrating an example method of interactive television according to embodiments. Note that there will be some overlap with respect to concepts as discussed above.

In processing block 1310, the content manager 140-1 renders content received over a cable network channel on display screen 130-1. The cable network channel can be allocated to distribute content originating from a content sponsor assigned to the cable network channel.

In processing block 1320, the content manager 140-1 receives a request to access web content associated with the cable network channel.

In response to receiving the request: In processing block 1340, the content manager 140-1 maps an identity of the cable network channel currently displayed on the display screen 130-1 to a network address of a server resource from which the web content (i.e., supplemental content) associated with the cable network channel is retrievable. In processing block 1350, the content manager 140-1 retrieves the web content from a server resource as specified by the network address. In processing block 1360, the content manager 140-1 initiates display of the retrieved web content on the display screen 130-1.

Figure 14:
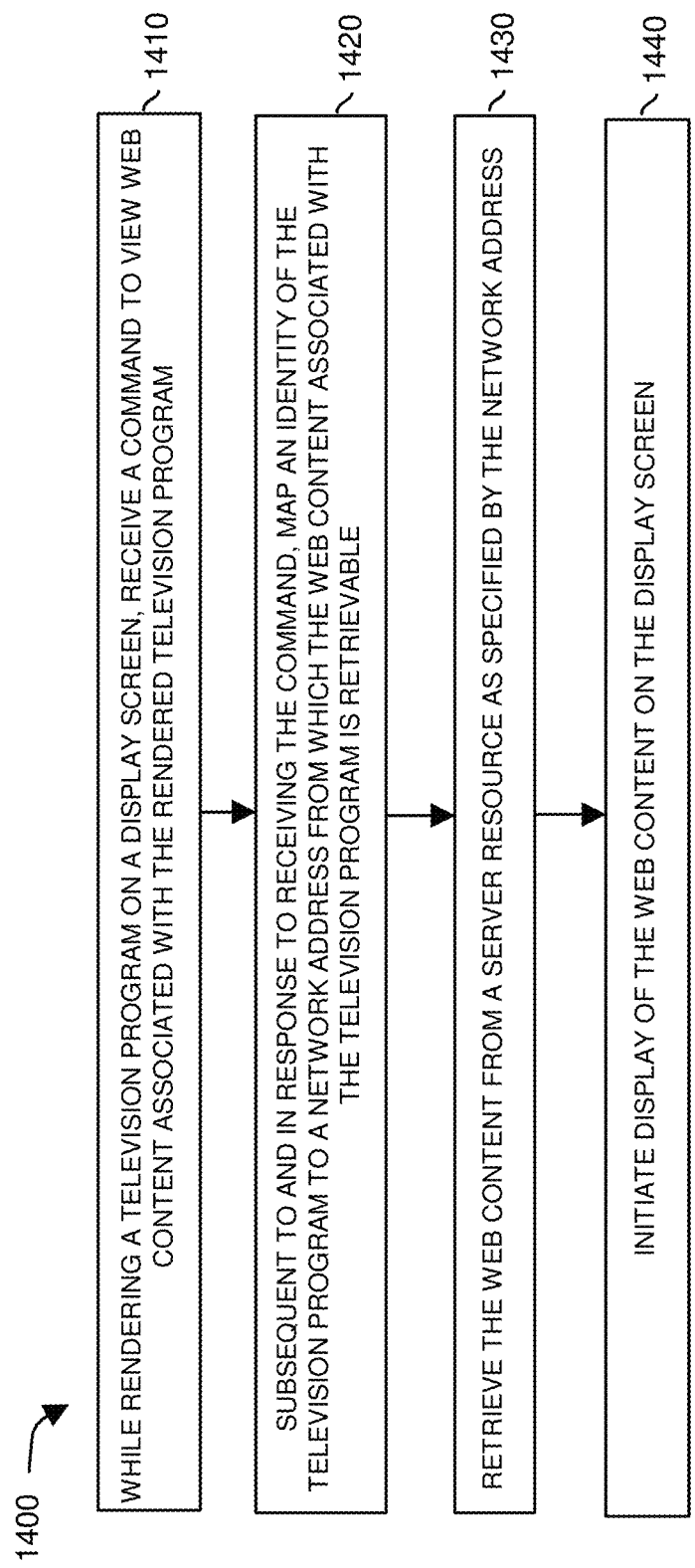
FIG. 14 is a flowchart illustrating an example method of providing notification of the availability of supplemental content according to embodiments herein.

FIG. 14 is a flowchart 1400 illustrating an example method of interactive television according to embodiments. Note that there will be some overlap with respect to concepts as discussed above.

In processing block 1410, while rendering a television program on a display screen 130-1, the content manager 140-1 receives a command to view web content associated with the rendered television program.

In processing block 1420, subsequent to and in response to receiving the command, the content manager 140-1 maps an identity of the television program being played back to a network address from which the web content associated with the television program is retrievable.

In processing block 1430, the content manager 140-1 retrieves the web content from a server resource as specified by the network address.

In processing block 1440, the content manager 140-1 initiates display of the web content on the display screen 130-1.

Figure 15:
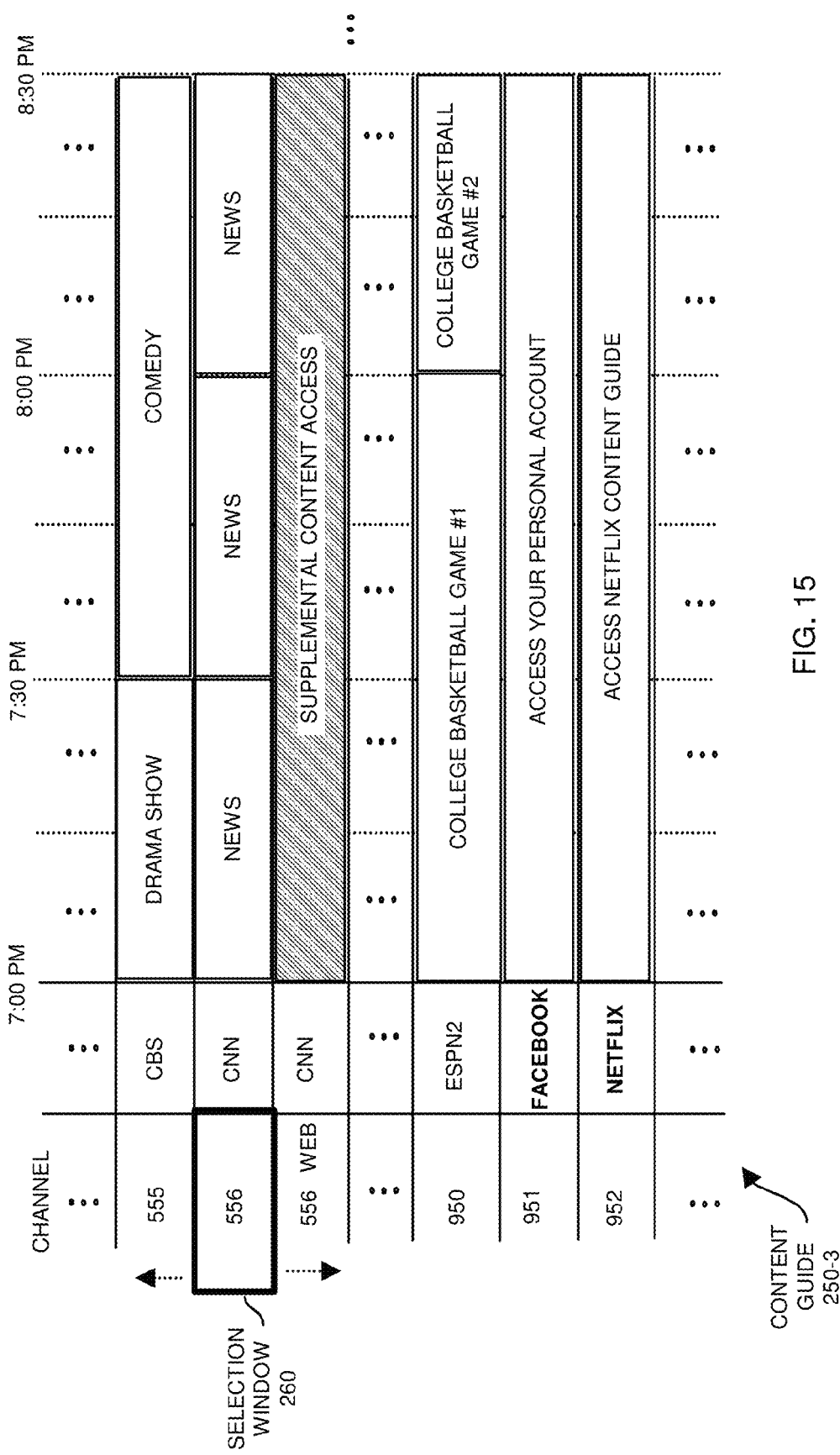
FIG. 15 is an example diagram illustrating of a content guide according to embodiments herein.

FIG. 15 is an example diagram illustrating a content guide according to embodiments herein.

In this example embodiment, assume that the content manager 140-1 receives a request from subscriber 108-1 to display content guide 250-3 on display screen 130-1. In response to receiving the request, the content manager 140-1 initiates display of the content guide 250-3 on the display screen 130-1.

The content guide 250-3 includes a display of multiple selectable channel viewing options. For example, the user 108-1 can move selection window 260 about regions of display screen 130-1 to select any of the available channels of content.

By way of a non-limiting example, channel 950 represents a first selectable channel viewing option that corresponds to a cable network television channel (such as ESPN2™) from which to retrieve content (e.g., a respective college basketball game #1) originating from a first content sponsor such as ESPN.

Channel 951 is a second selectable channel viewing option that corresponds to an auxiliary channel (e.g., an over-the-top channel) from which to access over-the-top content available from a second content sponsor such as Facebook™.

Channel 952 is a third selectable channel viewing option that corresponds to an auxiliary channel (e.g., an over-the-top channel) from which to access over-the-top content available from a third content sponsor such as Netflix™.

Via selection of any of the channels using selection window 260, the content manager 140-1 receives notification to tune to a respective channel.

Note that in addition to moving the respective navigation window 260 to select and view content as specified by the corresponding channel, the subscriber 108-1 can press one or more buttons on the control device 170-1 to select the appropriate sequence of numbers to select a channel. For example, the subscriber 108-1 can press buttons '9', '5', and '0' to select the channel 950; the subscriber 108-1 can press buttons '9', '5', and '1' to select the channel 951; the subscriber 108-1 can press buttons '9', '5', and '2' to select the channel 952; and so on. Accordingly, navigation and selection of a respective channel can be achieved in a number of different ways.

By way of further non-limiting example, the content guide 250-3 can initiate display of additional information in the different content viewing options. For example, channel 950 can be a content viewing option including a notification specifying a title assigned to respective playable content available in a scheduled time slot of the television channel 950; channel 951 can be a content viewing option including display of a notification specifying availability of the over-the-top content such as personal account information associated with Facebook™ via an auxiliary channel; channel 952 can be a content viewing option including display of a notification specifying availability of the over-the-top content such as a Netfllix content guide via an auxiliary channel; and so on.

Thus, as shown, available over-the-top content can be assigned a numerical value in a numerical sequence. The content manager 140-1 displays the content viewing options in accordance with the numerical channel sequence. More specifically, each numerical channel value (e.g., 950, 951, 952, . . . ) in the numerical channel sequence can be configured to specify a corresponding channel from which to retrieve available content. In the present example, the content manager 140-1 displays a first numerical channel value such as channel 950 to indicate content available from content sponsor ESPN2™ in content guide 250-3; the content manager 140-1 displays a second numerical channel value such as channel 951 to indicate content available from content sponsor Facebook™ in content guide 250-3; the content manager 140-1 displays a third numerical channel value such as channel 952 to indicate content available from content sponsor Netflix™ in content guide 250-3; and so on.

In one embodiment, responsive to receiving selection of numerical channel value 951, the content manager 140-1 maps the numerical channel value 951 to a respective network address associated with Facebook™. The network address indicates a server resource from which to retrieve the over-the-top content for retrieval and viewing on display screen 130-1. To display personal Facebook account information on display screen 130-1, the content manager 140-1 utilizes the network address to communicate with the server resource over an auxiliary channel (e.g., an over-the-top channel supported by one or more of data channels 123).

More specifically, the content manager 140-1 transmits a content request message over the auxiliary channel to retrieve the over-the-top content available from Facebook™. The content manager 140-1 receives the requested over-the-top content over the auxiliary channel from the server resource and renders the over-the-top content on the display screen 130-1. One embodiment herein can include storing personal settings associated with a respective subscriber and, upon selection of the channel 951, the content manager 140-1 utilizes the personal settings to request the personal information from the Facebook™ website for the subscriber. Accordingly, accessing a subscriber account can be achieved by merely selecting the channel 951.

Accordingly, embodiments herein can include: responsive to receiving selection of channel 951 in the content guide 250 (such as a cable network content guide), the content manager 140-1 initiates retrieval of personal social networking account information from a Facebook™ content sponsor website over an auxiliary channel. The content manager 140-1 then initiates display of the personal social networking account information on the display screen 130-1.

In a similar manner, the subscriber 108-1 can select channel 952. Responsive to receiving selection of the channel 952 (e.g., a selectable content viewing option) in the content guide 250-3, the content manager 140-1 initiates retrieval of content such as an over-the-top content guide for viewing different over-the-top content available from 3rd party content provider Netflix™. The content manager 140-1 initiates display of the over-the-top Netflix content guide on display screen 130-1.

Via further input to the retrieved and displayed over-the-top Netflix™ content guide, the subscriber can select a specific title of content amongst multiple titles of content displayed in the over-the-top Netflix™ content guide. For example, the subscriber 108-1 can provide further input of which of multiple content selections the subscriber 108-1 would like to retrieve for viewing on display screen 130-1.

As previously discussed, via selection of channel 950 in content guide 250-3 by subscriber 108-1, the content manager 140-1 tunes to the cable network television channel 950 such as a broadcast channel, IPTV channel, etc. In such an instance, the content manager 140-1 decodes a video signal received on the cable network television channel 950 and then renders video derived from the video signal on the display screen 130-1.

Figure 16:
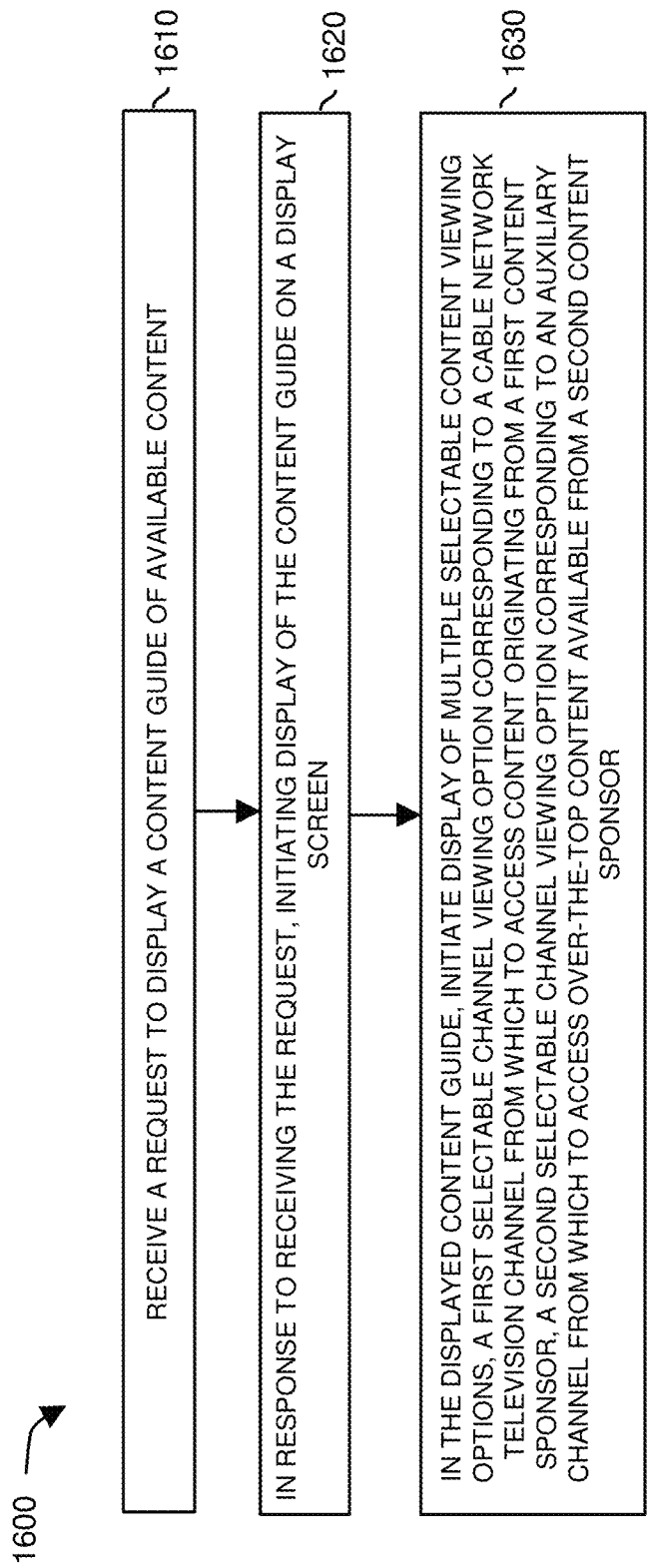
FIG. 16 is an example diagram illustrating an example method of providing notification of the availability of content from different types of content sources according to embodiments herein.

FIG. 16 is an example diagram illustrating of a method of providing notification of content from multiple types of sources according to embodiments herein.

In processing block 1610, the content manager 140-1 receives a request to display a content guide 250 of available content.

In processing block 1620, in response to receiving the request, the content manager 140-1 initiates display of the content guide 250-3 on the display screen 130-1.

In processing block 1610, in the displayed content guide 250-3, the content guide 250-3 initiates display of multiple selectable channel viewing options. A first selectable channel viewing option corresponds to a cable network television channel from which to access content originating from a first content sponsor. A second selectable channel viewing option corresponds to an auxiliary channel from which to access over-the-top content available from a second content sponsor.

Note again that techniques herein are well suited for use in a cable network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:

receiving a request to display a content guide of available content;

in response to receiving the request, initiating display of the content guide on a display screen; and in the displayed content guide, initiating simultaneous display of multiple selectable channel viewing options including a first selectable channel viewing option and a second selectable channel viewing option, the first selectable channel viewing option corresponding to a television channel from which to retrieve and view respective content originating from a content sponsor, the second selectable channel viewing option corresponding to an auxiliary channel with respect to the television channel from which to retrieve and view available supplemental over-the-top content associated with the respective content originating from the content sponsor, the content guide indicating multiple programs associated with the first selectable channel viewing option that are scheduled for distribution over the television channel at different times, the content guide further indicating that the supplemental over-the-top content is associated with the multiple programs and is available over the auxiliary channel at the different times;

wherein initiating display of the multiple selectable channel viewing options includes: initiating display of the first selectable channel viewing option and the second selectable channel viewing option in columnar form in the content guide, the first selectable channel viewing option residing in a first row of the content guide, the first row of the content guide including a title for each of multiple programs associated with the first selectable channel viewing option, the second selectable channel viewing option residing in a second row of the content guide, the second row of the content guide including a description of the supplemental content associated with the second selectable channel viewing option;

wherein the first selectable channel viewing option includes a channel identifier value assigned to the television channel; and wherein the second selectable channel viewing option includes: i) the channel identifier value assigned to the television channel, and ii) a text-based symbol indicating that the second selectable channel viewing option represents the auxiliary channel for retrieving the supplemental over-the-top content.

2. The method as in claim 1, wherein initiating simultaneous display of the multiple selectable channel viewing options includes:

for the first selectable channel viewing option, initiating display of a first notification specifying the respective content, the first notification indicating that the respective content is available in a scheduled time slot of the television channel; and for the second selectable channel viewing option, initiating display of a second notification specifying availability of the supplemental over-the-top content via the auxiliary channel.

3. The method as in claim 1 further comprising:
responsive to receiving selection of the first selectable channel viewing option:
tuning to the television channel, the television channel received on a shared communication link of a cable network;
decoding a video signal received on the television channel; and
rendering video derived from the video signal on the display screen.

4. The method as in claim 3 further comprising:
while rendering the video derived from the video signal on the display screen, receiving input from a respective user selecting to view the supplemental over-the-top content available over the auxiliary channel; and
in response to receiving the input, retrieving a menu of content viewing options; and
displaying a rendition of the menu of content viewing options on the display screen, each of the content viewing options in the menu corresponding to different content available from the content sponsor over the auxiliary channel.

5. The method as in claim 4 further comprising:
in accordance with control input received from a user viewing the display screen, toggling between retrieving and displaying the respective content and the supplemental over-the-top content on the display screen.

6. The method as in claim 5 further comprising:
storing portions of the respective content received over the television channel while the control input indicates to display a rendition of the supplemental over-the-top content on the display screen; and
in response to detecting that the user switches back to viewing the respective content on the television channel after viewing the supplemental over-the-top content on the display screen, initiating display of the stored portions of the respective content for viewing by the user.

7. The method as in claim 1 further comprising:
responsive to receiving selection of the second selectable channel viewing option:
obtaining a network address, the network address indicating a server resource from which to retrieve a home page of the content sponsor;
utilizing the network address to communicate with the server resource over the auxiliary channel to retrieve the home page.

8. The method as in claim 7 further comprising:
transmitting a content request message over the auxiliary channel to retrieve display information generated by the content sponsor;
receiving the display information over the auxiliary channel from the server resource; and
rendering the display information on the display screen.

9. The method as in claim 8, wherein rendering the display information includes:
as specified by the display information, initiating display of a set of selectable content viewing options on the display screen, the set of selectable content viewing options specifying different content available for selection and retrieval over the auxiliary channel from the content sponsor; and
in response to selection of a particular selectable content viewing option from the set, initiating a communication over the auxiliary channel to the server resource to retrieve content as specified by the particular selectable content viewing option.

10. The method as in claim 1, wherein receiving the request to display the content guide includes:
receiving the request from a subscriber in a cable network environment, the subscriber having access to the television channel and the supplemental over-the-top content via a shared communication link in the cable network environment, the shared communication link supporting distribution of content to multiple subscribers in the cable network environment, a first portion of bandwidth in the shared communication link allocated to broadcast the respective content to the subscriber, a second portion of the bandwidth in the shared communication link allocated to convey the supplemental over-the-top content to the subscriber.

11. The method as in claim 1 further comprising:
in response to receiving selection of the first selectable channel viewing option, rendering the respective content received over the television channel on the display screen;
while displaying a rendition of the respective content received over the television channel, receiving a command to display a menu of selectable over-the-top content viewing options available from the content sponsor over the auxiliary channel; and
in response to receiving the command, initiating display of the menu of selectable over-the-top content viewing options, each of the selectable over-the-top content viewing options in the menu corresponding to different retrievable content available for display on the display screen.

12. The method as in claim 11, wherein initiating display of the menu of selectable over-the-top content viewing options includes:
rendering the menu of selectable over-the-top content viewing options as a picture-in-picture in which the menu is overlaid on the respective content rendered from the television channel.

13. The method as in claim 1, wherein the content sponsor originates the supplemental over-the-top content.

14. The method as in claim 1 further comprising:
initiating display of the multiple selectable channel viewing options in accordance with a numerical channel sequence, each numerical channel value in the numerical channel sequence specifying a corresponding channel from which to retrieve available content;
in the first selectable channel viewing option displayed in the content guide, initiating display of a first unique channel value from the numerical channel sequence, the first unique channel value assigned to the television channel; and
in the second selectable channel viewing option displayed in the content guide, initiating display of a second unique channel value from the numerical channel sequence, the second unique channel value assigned to the auxiliary channel.

15. The method as in claim 14, wherein the first unique channel value includes an integer value assigned to the television channel from which the respective content is available; and
wherein the second unique channel value includes a first portion and a second portion, the first portion of the second unique channel value including the integer value assigned to the television channel.

16. The method as in claim 15, wherein the second portion of the second unique channel value includes a sequence of text indicating that the supplemental over-the-top content associated with the respective content is available over the auxiliary channel.

17. The method as in claim 15, wherein the second portion of the second unique channel value includes a sequence of text indicating that the supplemental over-the-top content associated with the respective content is supplemental content associated with the television channel.

18. The method as in claim 16 further comprising:
responsive to receiving selection of the second unique channel value:
mapping the second unique channel value to a respective network address, the network address indicating a server resource from which to retrieve the supplemental over-the-top content for retrieval and viewing; and
utilizing the network address to communicate with the server resource over the auxiliary channel.

19. The method as in claim 18 further comprising:
responsive to receiving selection of the first unique channel value:
tuning to the television channel, the television channel received on a shared communication link of a cable network, the television channel being a broadcast channel;
decoding a video signal received on the television channel; and
rendering video derived from the video signal on the display screen.

20. The method as in claim 18, wherein utilizing the network address to communicate with the server resource over the auxiliary channel includes:
transmitting a content request message over the auxiliary channel to retrieve the supplemental over-the-top content;
receiving the supplemental over-the-top content over the auxiliary channel from the server resource; and
rendering the supplemental over-the-top content on the display screen.

21. The method as in claim 1, wherein receiving the request to display the content guide includes:
receiving the request from a subscriber in a cable network environment, the subscriber having access to the television channel and the auxiliary channel via a shared communication link in the cable network environment, the shared communication link supporting distribution of content to multiple subscribers in the cable network environment, a first portion of bandwidth in the shared communication link allocated to convey the respective content as broadcast content over the television channel, a second portion of the bandwidth in the shared communication link allocated to convey the supplemental over-the-top content originating from the content sponsor to the subscriber over the auxiliary channel.

22. The method as in claim 1 further comprising:
responsive to receiving selection of the second selectable channel viewing option:
obtaining a network address assigned to a server resource from which the supplemental over-the-top content is available, the supplemental over-the-top content representing a home page of the content sponsor; and
utilizing the network address to communicate with the server resource over the auxiliary channel and retrieve the home page of the content sponsor.

23. The method as in claim 1, wherein initiating simultaneous display of the multiple selectable channel viewing options comprises:
initiating display of a first rendition of a symbol indicative of and assigned to the content sponsor, the display of the first rendition of the symbol associating the first selectable channel viewing option to the content sponsor; and
initiating display of a second rendition of the symbol indicative of and assigned to the content sponsor, the display of the second rendition of the symbol associating the second selectable channel viewing option to the supplemental over-the-top content and the content sponsor.

24. The method as in claim 1, wherein initiating simultaneous display of the multiple selectable channel viewing options comprises:
initiating display of a channel number assigned to the television channel, the display of the channel number associating the first selectable channel viewing option to the television channel; and
initiating display of the channel number and supplemental text to indicate that the second selectable channel viewing option and the supplemental over-the-top content are associated with the television channel.

25. The method as in claim 1 further comprising:
on the display screen, initiating playback of the respective content received over the television channel, the respective content received as a video stream;

receiving input to retrieve and playback the supplemental over-the-top content on the display screen in lieu of playing back the respective content on the display screen;

in response to receiving the input, storing a pointer pointing to a location in the respective video stream corresponding to a time at which the input indicated to retrieve and playback the supplemental over-the-top content from the auxiliary channel; and upon switchover back to viewing the video stream, initiating playback of the video stream at the location as specified by the pointer.

26. A computer system comprising:

at least one processor device; and a hardware storage resource coupled to the at least one processor device, the hardware storage resource storing instructions that, when executed by the at least one processor device, cause the at least one processor device to perform operations of:

receiving a request to display a content guide of available content;

in response to receiving the request, initiating display of the content guide on a display screen; and in the displayed content guide, initiating display of multiple selectable channel viewing options including: i) a first selectable channel viewing option representing a television channel from which to view respective content provided by a content sponsor, and ii) a second selectable channel viewing option representing an auxiliary channel with respect to the television channel from which to retrieve and view available supplemental content associated with the respective content originating from the content sponsor, the content guide indicating multiple programs associated with the first selectable channel viewing option that are scheduled for distribution over the television channel at different times, the content guide further indicating supplemental content associated with the multiple programs available over the auxiliary channel at the different times;

wherein initiating display of the multiple selectable channel viewing options includes: initiating display of the first selectable channel viewing option and the second selectable channel viewing option in columnar form in the content guide, the first selectable channel viewing option residing in a first row of the content guide, the first row of the content guide including a title for each of the multiple programs associated with the first selectable channel viewing option, the second selectable channel viewing option residing in a second row of the content guide, the second row of the content guide including a description of the supplemental content associated with the second selectable channel viewing option;

wherein the first selectable channel viewing option includes a channel identifier value assigned to the television channel; and wherein the second selectable channel viewing option includes: i) the channel identifier value assigned to the television channel, and ii) a text-based symbol indicating that the second selectable channel viewing option represents the auxiliary channel for retrieving the supplemental content as over-the-top content.

27. The computer system as in claim 26, wherein initiating display of the multiple selectable channel viewing options includes:

for the first selectable channel viewing option, initiating display of a first notification specifying playable content available in a scheduled time slot of the television channel; and for the second selectable channel viewing option, initiating display of a second notification specifying availability of the supplemental content via the auxiliary channel.

28. The computer system as in claim 26, wherein the at least one processor device further supports operations of:

responsive to receiving selection of the second selectable channel viewing option:

mapping an identity of the content sponsor to a network address, the network address indicating a server resource from which to retrieve a home page of the content sponsor; and utilizing the network address to communicate with the server resource over the auxiliary channel.

29. The computer system as in claim 28, wherein the at least one processor device further supports operations of:

transmitting a content request message over the auxiliary channel to retrieve display information generated by the content sponsor;

receiving the display information over the auxiliary channel from the server resource; and rendering the display information on the display screen.

30. The computer system as in claim 29, wherein rendering the display information includes:

as specified by the display information, initiating display of a set of selectable content viewing options on the display screen, the set of selectable content viewing options specifying different content available for selection and retrieval over the auxiliary channel; and in response to selection of a particular selectable content viewing option from the set, initiating a communication over the auxiliary channel to the server resource to retrieve content as specified by the particular selectable content viewing option.

31. The computer system as in claim 26, wherein the at least one processor device further supports operations of:

in response to receiving selection of the first selectable channel viewing option, rendering content received over the television channel on the display screen;

while displaying the respective content received over the television channel, receiving a command to display a menu of selectable over-the-top content viewing options available from the content sponsor; and in response to receiving the command, initiating display of the menu of selectable over-the-top content viewing options.

32. The computer system as in claim 26, wherein the supplemental content includes first supplemental content and second supplemental content, the first supplemental content assigned to a first playback time in a first program of the multiple programs associated with the first selectable channel viewing option, the second supplemental content assigned to a second playback time in the first program.

33. The computer system as in claim 26, wherein initiating display of the multiple selectable channel viewing options includes:

initiating display of the first selectable channel viewing option and the second selectable channel viewing option in columnar form in the content guide;

the first selectable channel viewing option residing in a first row of the content guide, the first row of the content guide including a title for each of the multiple programs associated with the first selectable channel viewing option; and the second selectable channel viewing option residing in a second row of the content guide, the second row of the content guide including a description of the supplemental content associated with the second selectable channel viewing option.

34. The computer system as in claim 33, wherein the first selectable channel viewing option includes a channel identifier value assigned to the television channel; and wherein the second selectable channel viewing option includes: i) the channel identifier value assigned to the television channel, and ii) a text-based symbol indicating that the second selectable channel viewing option represents the auxiliary channel for retrieving the supplemental content as over-the-top content.

35. The computer system as in claim 34, wherein the supplemental content includes first supplemental content and second supplemental content, the first supplemental content pertaining to a first playable portion of a first program of the multiple programs associated with the first selectable channel viewing option, the second supplemental content pertaining to a second playable portion of the first program.

36. Computer-readable storage hardware having instructions stored thereon, the instructions, when carried out by a processing device, causes the processing device to perform operations of:

receiving a request to display a content guide of available content;

in response to receiving the request, initiating display of the content quide on a display screen; and in the displayed content guide, initiating simultaneous display of multiple selectable channel viewing options includinq a first selectable channel viewing option and a second selectable channel viewing option, the first selectable channel viewing option corresponding to a television channel from which to retrieve and view respective content originating from a content sponsor, the second selectable channel viewing option corresponding to an auxiliary channel with respect to the television channel from which to retrieve and view available supplemental over-the top content associated with the respective content originating from the content sponsor, the content guide indicating multiple programs associated with the first selectable channel viewing option that are scheduled for distribution over the television channel at different times, the content guide further indicating that the supplemental over-the-top content is associated with the multiple programs and is available over the auxiliary channel at the different times;

wherein initiating display of the multiple selectable channel viewing options includes: initiating display of the first selectable channel viewing option and the second selectable channel viewing option in columnar form in the content guide, the first selectable channel viewing option residing in a first row of the content guide, the first row of the content guide including a title for each of multiple programs associated with the first selectable channel viewing option, the second selectable channel viewing option residing in a second row of the content guide, the second row of the content guide including a description of the supplemental content associated with the second selectable channel viewing option;

wherein the first selectable channel viewing option includes a channel identifier value assigned to the television channel; and wherein the second selectable channel viewing option includes: i) the channel identifier value assigned to the television channel, and ii) a text-based symbol indicating that the second selectable channel viewing option represents the auxiliary channel for retrieving the supplemental over-the-top content.

\* \* \* \* \*